(12) United States Patent
Nagasawa et al.

(10) Patent No.: US 10,155,683 B2
(45) Date of Patent: Dec. 18, 2018

(54) GLASS TUBE PRODUCTION METHOD, GLASS ARTICLE PRODUCTION METHOD, GLASS TUBE, GLASS ARTICLE, AND GLASS ARTICLE PRODUCTION APPARATUS

(71) Applicant: Asahi Glass Company, Limited, Chiyoda-ku (JP)

(72) Inventors: Ikuo Nagasawa, Chiyoda-ku (JP); Jun Ito, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/907,674

(22) Filed: Feb. 28, 2018

(65) Prior Publication Data

US 2018/0186680 A1    Jul. 5, 2018

Related U.S. Application Data

(63) Continuation of application No. PCT/JP2016/075475, filed on Aug. 31, 2016.

(30) Foreign Application Priority Data

Sep. 4, 2015   (JP) .................................. 2015-175178

(51) Int. Cl.
*C03B 33/095*      (2006.01)
*C03C 21/00*       (2006.01)
(Continued)

(52) U.S. Cl.
CPC .......... *C03B 33/0955* (2013.01); *B23K 26/55* (2015.10); *C03B 33/095* (2013.01);
(Continued)

(58) Field of Classification Search
CPC ... C03B 33/0955; C03B 33/095; C03C 21/00; C03C 23/00; C03C 21/002; C03C 23/0025; B23K 26/55; F16L 9/105
See application file for complete search history.

(56) References Cited

U.S. PATENT DOCUMENTS

| 2012/0196071 A1 | 8/2012 | Cornejo et al. |
| 2013/0068505 A1 | 3/2013 | Hong et al. |

(Continued)

FOREIGN PATENT DOCUMENTS

| JP | 2013-536081 | 9/2013 |
| JP | 2014-531391 | 11/2014 |

OTHER PUBLICATIONS

International Search Report dated Dec. 6, 2016 in PCT/JP2016/075475 filed Aug. 31, 2016 (with English Translation).

(Continued)

*Primary Examiner* — Michael C Miggins
(74) *Attorney, Agent, or Firm* — Oblon, McCLelland, Maier & Neustadt, L.L.P.

(57) ABSTRACT

A glass tube production method includes (1) preparing a tubular glass material, (2) irradiating an outer main surface of the tubular glass material with a laser to form an in-plane void region having a plurality of voids arranged on the outer main surface, and forming a plurality of internal void rows each having one void or two or more voids arranged from the in-plane void region toward an inner main surface of the tubular glass material, and (3) chemically strengthening the tubular glass material having the internal void rows formed therein.

15 Claims, 17 Drawing Sheets

(51) Int. Cl.
*C03C 23/00* (2006.01)
*B23K 26/55* (2014.01)
*F16L 9/10* (2006.01)

(52) U.S. Cl.
CPC ............ *C03C 21/00* (2013.01); *C03C 21/002* (2013.01); *C03C 23/00* (2013.01); *C03C 23/0025* (2013.01); *F16L 9/105* (2013.01)

(56) References Cited

U.S. PATENT DOCUMENTS

2013/0126573 A1 5/2013 Hosseini et al.
2014/0083983 A1 3/2014 Zhang et al.
2014/0151370 A1 6/2014 Chang et al.
2015/0166393 A1 6/2015 Marjanovic et al.

OTHER PUBLICATIONS

Written Opinion dated Dec. 6, 2016 in PCT/JP2016/075475 filed Aug. 31, 2016.

GLASS TUBE PRODUCTION METHOD, GLASS ARTICLE PRODUCTION METHOD, GLASS TUBE, GLASS ARTICLE, AND GLASS ARTICLE PRODUCTION APPARATUS

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/075475 filed on Aug. 31, 2016 and designating the U.S., which claims priority of Japanese Priority Application No. 2015-175178 filed on Sep. 4, 2015. The entire contents of the foregoing application are incorporated herein by reference.

BACKGROUND OF THE INVENTION

1. Field of the Invention

The disclosure discussed herein generally relates to a glass article, a glass tube and the like, in particular to a chemically strengthened glass article, a chemically strengthened glass tube, and the like.

2. Description of the Related Art

Laboratory glass tubes, medical glass tubes, heat collection glass tubes, etc., used for producing glass articles may generally require high strength. A chemical strengthening treatment is thus often applied to such glass tubes which act as materials for glass articles.

The chemical strengthening treatment is a process of immersing a glass tube in a molten salt containing an alkali metal to replace alkali metal ions having a smaller atomic diameter present on the surface of the glass tube with alkali metal ions having a larger atomic diameter present in the molten salt.

The application of the chemical strengthening treatment introduces alkali metal ions having an atomic diameter larger than that of the original atom to the surface of the glass tube. As a result, a compressive stress layer is formed on the surface of the glass substrate, thereby improving the strength of the glass tube.

Note that chemically strengthened glass articles are typically produced through the following steps:

(I) preparing a large-sized tubular glass material;
(II) cutting and acquiring two or more glass tubes having a product shape from the large-sized tubular glass material; and
(III) chemically strengthening the acquired glass tubes.

CITATION LIST

Patent Literature

[PTL 1] U.S. Patent Application Publication No. 2015/0166393
[PTL 2] Japanese Translation of PCT International Application Publication No. JP-T-2013-536081
[PTL 3] U.S. Patent Application Publication No. 2012/0196071

SUMMARY OF THE INVENTION

Technical Problem

In the related-art production method, a large number of glass tubes having a final shape may need to be handled from the cutting in (II) to the chemical strengthening treatment in (III). However, the glass tubes at this stage are yet to be chemically strengthened, indicating that the glass tubes may be particularly prone to scratch on its end face. Thus, sufficiently careful handling may be required for these glass tubes. For example, to chemically strengthen a glass tube having a final shape, sufficient measures may be required for supporting or identifying the glass tube in the molten salt or for contacting the glass tube with a glass tube handling tool.

As described above, the related-art production method may have some difficulty in handling of glass tubes. In addition, the related-art production method may have some difficulty in ensuring mainly the quality of strength in the finally obtained glass articles, failing to exhibit much improvement in the producing yield of the glass articles.

In order to overcome such difficulties, the following production method may be considered; that is, a chemical strengthening treatment is applied to a large-sized glass material in advance, and the large-sized glass material is subsequently cut to thereby produce chemically strengthened glass articles.

However, such a production method still has a difficulty in cutting the glass articles from the glass material because the surface of the glass material is chemically strengthened. Further, even when a glass article is assumed to have been successfully cut out by the above-described production method, the glass article obtained by this production method has an end face that will not be chemically strengthened, thereby failing to acquire sufficient strength.

The present invention has been made in view of such a background, and it is an object of the present invention to provide a glass article production method and a glass tube production method capable of providing a glass article having excellent strength while significantly controlling deterioration in external appearance quality due to scratches. It is also an object of the present invention to provide a glass article and a glass tube produced by such production methods. In addition, it is still an object of the present invention to provide a glass article producing apparatus capable of producing such a glass article.

Solution to Problem

A glass tube production method according to an embodiment of the present invention includes the following steps:

(1) preparing a tubular glass material;
(2) irradiating an outer main surface of the tubular glass material with a laser to form an in-plane void region having a plurality of voids arranged on the outer main surface, and forming a plurality of internal void rows each having one void or two or more voids arranged from the in-plane void region toward an inner main surface of the tubular glass material; and
(3) chemically strengthening the tubular glass material having the internal void rows formed therein.

In this glass tube production method, the glass material in the step (1) may be produced by a person who performs the glass tube production method, or may be purchased from a third party.

Further, a glass article production method according to an embodiment of the present invention includes the following steps:

producing a glass tube by the glass tube production method having the above-described features, the glass tube having a first main surface corresponding to the outer main surface of the glass material and a second main surface corresponding to the inner main surface of the glass material; and separating one glass article, or two or more glass articles from the glass tube along a plane passing through the in-plane void region and the plurality of internal void rows.

In addition, a glass tube according to an embodiment of the present invention includes an in-plane void region having a plurality of voids arranged on an outer main surface of the glass tube; and a plurality of internal void rows each having one void or two or more voids arranged from the in-plane void region toward an inner main surface of the glass tube; and a cut surface obtained by cutting the glass tube to pass through the in-plane void region and the plurality of internal void rows, the cut surface having a compressive stress layer formed by applying a chemical strengthening treatment over the entire cut surface.

Further, a glass tube according to an embodiment of the present invention includes an in-plane void region having a plurality of voids arranged on an outer main surface of the glass tube; and a plurality of internal void rows each having one void or two or more voids arranged from the in-plane void region toward an inner main surface of the glass tube; and a cut surface obtained by cutting the glass tube to pass through the in-plane void region and the plurality of internal void rows, the cut surface having a concentration profile of predetermined alkali metal ions from the outer main surface of the glass tube to the inner main surface of the glass tube indicating concentration of the predetermined alkali metal ions being higher than bulk concentration of the glass tube, where the predetermined alkali metal ions provide a compressive stress layer to at least the outer main surface of the glass tube to increase strength of at least the outer main surface of the glass tube.

Moreover, a glass tube according to an embodiment of the present invention includes an in-plane void region having a plurality of voids arranged on an outer main surface of the glass tube; and a plurality of internal void rows each having one void or two or more voids arranged from the in-plane void region toward an inner main surface of the glass tube; and a cut surface obtained by cutting the glass tube to pass through the in-plane void region and the plurality of internal void rows, the cut surface having a concentration profile of predetermined alkali metal ions from the outer main surface of the glass tube to the inner main surface of the glass tube indicating concentration of the alkali metal ions becoming higher toward at least the outer main surface of the glass tube, where the predetermined alkali metal ions provide a compression stress layer to at least the outer main surface to increase strength of at least the outer main surface, and where the concentration profile of the cut surface indicates concentration of the alkali metal ions being higher than bulk concentration of the glass tube.

Further, a glass article according to an embodiment of the present invention includes an outer main surface;

an inner main surface; and at least one end face joining the outer and inner main surfaces, where the end face has a concentration profile of predetermined alkali metal ions from the outer main surface to the inner main surface indicating concentration of the alkali metal ions becoming higher toward at least the outer main surface, where the predetermined alkali metal ions provide a compression stress layer to at least the outer main surface to increase strength of at least the outer main surface, and where the concentration profile of the end face indicates concentration of the alkali metal ions being higher than bulk concentration of the glass article.

Further, a glass article producing apparatus according to an embodiment of the present invention includes a separation unit configured to separate one glass article or two or more glass articles from the glass tube having the above-described features, where the separation unit separates the one glass article or two or more glass articles by applying a pressure to the outer main surface of the glass tube and/or by applying a tensile stress due to a thermal stress along the in-plane void region of the glass tube.

Advantageous Effect of Invention

The present invention may provide a glass article production method and a glass tube production method capable of providing a glass article having excellent strength while significantly controlling deterioration in external appearance quality due to scratches. The present invention may further provide a glass article and a glass tube produced by such production methods. In addition, the present invention may still further provide a glass article producing apparatus capable of producing such a glass article.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

The following describes an embodiment of the present invention with reference to accompanying drawings.

(Glass Article Production Method According to One Embodiment of the Present Invention)

In the following, a method for producing a glass article according to an embodiment of the present invention will be described with reference to FIGS. 1 to 7.

Figure 1:
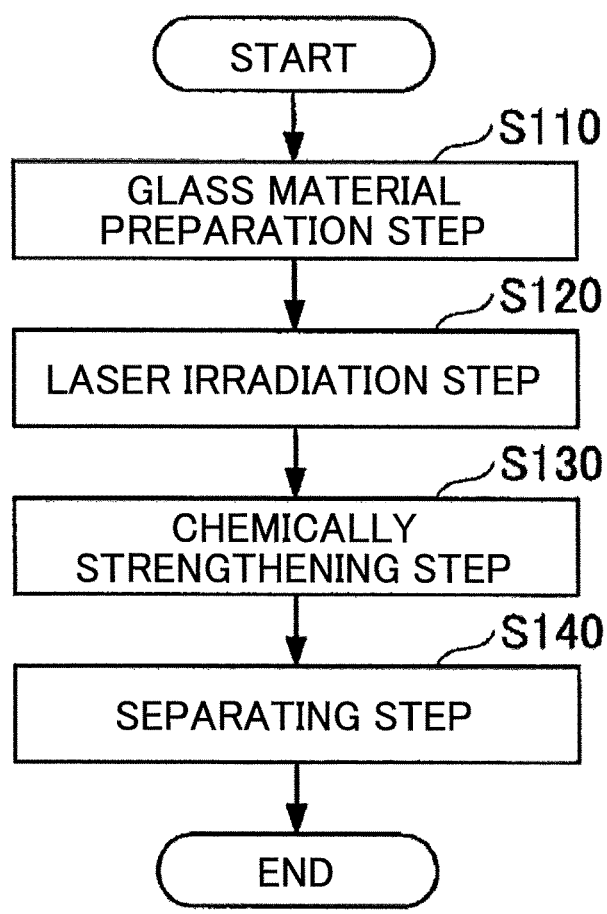
FIG. 1 is a flowchart schematically illustrating a method for producing a glass article according to an embodiment of the present invention.

FIG. 1 schematically illustrates a flow of a method for producing a glass article (hereinafter referred to as a "first production method") according to an embodiment of the present invention.

As illustrated in FIG. 1, the first production method includes a step of preparing a tubular glass material (glass material preparation step) (step S110);

a step of irradiating an outer main surface of the tubular glass material with a laser to form an in-plane void region in the outer main surface of the tubular glass material and to form an internal void row inside the tubular glass material (laser irradiation step) (step S120);

a step of chemically strengthening the tubular glass material (chemical strengthening step) (step S130); and a step of separating a glass article from the chemically strengthened tubular glass material along the in-plane void region and the internal void row (separation step) (step S140).

The respective steps will be described below with reference to FIGS. 2 to 7. FIGS. 2 to 7 are diagrams schematically illustrating respective steps of the first production method. The outer main surface and an inner main surface are hereinafter expressed as a first main surface and a second main surface, respectively.

(Step S110)

First, a tubular glass material having a first main surface and a second main surface opposite each other is prepared.

A glass composition of the glass material is not particularly specified insofar as the glass composition is capable of being chemically strengthened. The glass material may be, for example, soda-lime glass, aluminosilicate glass, alkali aluminosilicate glass or the like.

At this stage, the glass material may be or may not be applied with a chemical strengthening treatment. Noted that the chemical strengthening treatment described above differs from the chemical strengthening treatment applied in the later-described step S130.

In order to clarify this difference, the chemical strengthening treatment at this stage is called a "preliminary chemical strengthening treatment" to be distinguished from the later-described chemical strengthening treatment.

The number of preliminary chemical strengthening treatments to be applied may be once, or twice or more, and is not particularly limited. When the preliminary chemical strengthening treatment is applied twice or more, a profile of a residual stress layer in a direction orthogonal to the main surface may be made different from a profile obtained when the preliminary chemical strengthening treatment is applied only once.

The thickness of the glass material is not particularly specified; the thickness of the glass material may be in a range of 0.1 to 10 mm, for example.

The glass material need not be a linear tube and may be a bent tube. Further, the diameter of the tube may be constant or vary along the axis of the tube. The shape of the cross section orthogonal to the axis of the tube may be circular, elliptical, polygonal, or a combination of compound curves.

Figure 2:
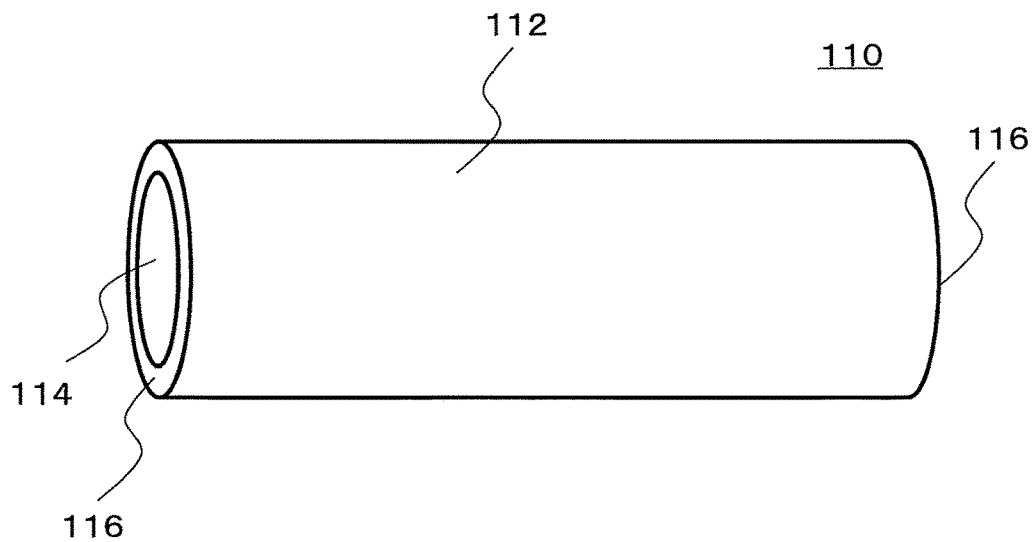
FIG. 2 is a diagram schematically illustrating a configuration of a glass material that may be used in a method for producing a glass article according to an embodiment of the present invention.

FIG. 2 schematically illustrates a configuration of a tubular glass material 110 as an example. The glass material 110 has a first main surface 112, a second main surface 114, and an end face 116.

(Step S120)

Next, the tubular glass material 110 is irradiated with a laser. As a result, an in-plane void region is formed on the first main surface 112 of the glass material 110. Plural internal void rows are formed from the in-plane void region toward a tube axis side, that is, toward the second main surface 114.

Note that the "in-plane void region" indicates a linear region having two or more surface voids formed in a predetermined arrangement. In addition, the "internal void row" indicates a linear region having one void or two or more voids formed in the glass material from the first main surface toward the second main surface.

Figure 3:
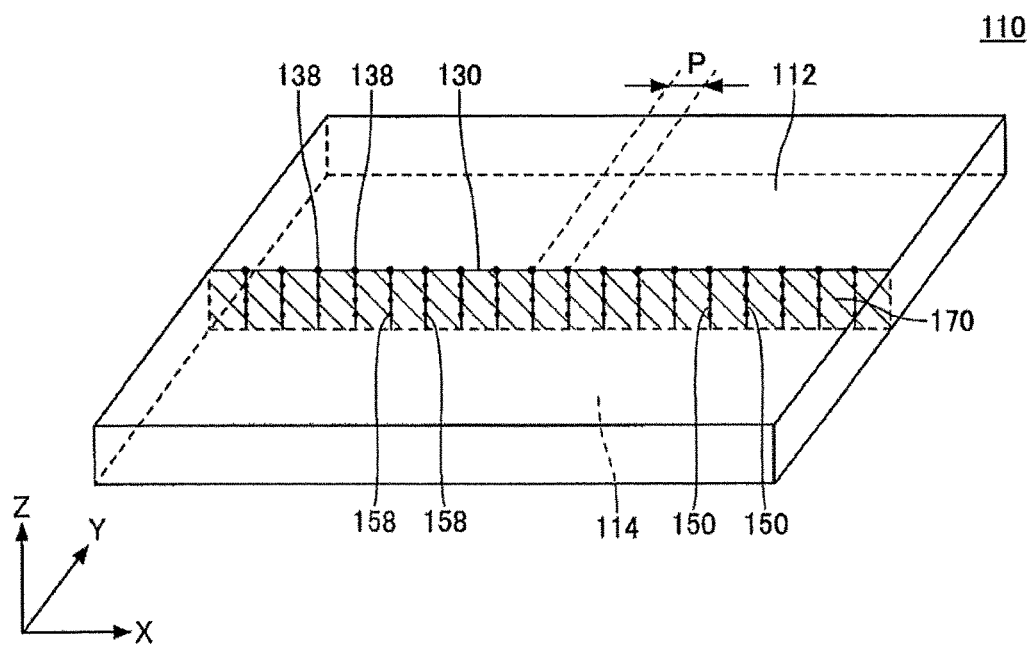
FIG. 3 is a schematic diagram describing respective configurations of an in-plane void region and internal void rows.

In the following, configurations of "in-plane void region" and "internal void row" will be described in more detail with reference to FIG. 3. FIG. 3 schematically illustrates an in-plane void region and internal void rows formed on the outer surface of the glass material. Note that FIG. 3 only partially illustrates the in-plane void region and the internal void rows formed on the outer surface.

As depicted in FIG. 3, the glass material 110 includes one in-plane void region 130 and two or more internal void rows 150 formed corresponding to the in-plane void region 130.

As described above, the in-plane void region 130 indicates a linear region having two or more surface voids 138 formed in a predetermined arrangement. For example, in the example of FIG. 3, two or more surface voids 138 are arranged in a certain direction (X direction) in the first main surface 112 of the glass material 110, thereby forming an in-plane void region 130.

Each surface void 138 corresponds to the irradiation position of a laser on the first main surface 112, and has a diameter of, for example, 1 to 5 μm. Note that the diameter of the surface void 138 varies with a laser irradiation condition, a type of the glass material 110, and the like.

The distance P between the centers of the adjacent surface voids 138 may be determined based on the composition and thickness of the glass material 110, laser processing conditions, and the like. For example, the distance P between the centers of the adjacent surface voids 13 may be in a range of 2 to 10 μm. Note that the distance P between the centers of the surface voids 138 does not have to be equal at all positions, and may be different according to places. That is, the surface voids 138 may be arranged at non-equal intervals.

As described above, the internal void row 150 indicates a linear region having one void 158 or two or more voids 158 in the glass material 110 from the first main surface 112 toward the second main surface 114.

The shape, size, and pitch of the voids 158 are not particularly specified. The void 158 may have a shape such as a circle, an ellipse, a rectangle, a triangle, or the like when viewed from the Y direction, for example. Further, the maximum dimension of the void 158 (typically corresponding to the length of the void 158 along an extending direction of the internal void row 150) when viewed from the Y direction may, for example, be in a range of 0.1 to 1000 μm.

Each of internal void rows 150 has a corresponding one of surface voids 138. For example, a total number of 18 internal void rows 150 corresponding to 18 surface voids 138 are formed in the example illustrated in FIG. 3.

In the example of FIG. 3, the voids 158 forming one internal void row 150 are arranged along the thickness direction (Z direction) of the glass material 110. That is, each of internal void rows 150 extends in the Z direction. Note that this is merely an example, and respective voids forming the internal void row 150 that are arranged from the first main surface 112 to the second main surface 114 may be inclined with respect to the Z direction.

Further, in the example of FIG. 3, each internal void row 150 is composed of a total number of three voids 158 except for the surface void 138. Note that this is merely an example, and each internal void row 150 may be composed of one or two voids 158, or four or more voids 158. Further, the number of voids 158 involved may be different in each of the internal void rows 150. In addition, some voids 158 may be coupled with surface voids 138 to form "long" surface voids 138.

Furthermore, each internal void row 150 may or may not have a void (second surface void) opened at the second surface 114.

As is apparent from the above description, it should be noted that the in-plane void region 130 represents a region that is not actually formed as a continuous "line" but a virtual linear region that is formed by connecting respective surface voids 138.

Similarly, it should be noted that the internal void row 150 represents a region that is not actually formed as a continuous "line" but a virtual linear region that is formed by connecting respective voids 158.

Furthermore, one in-plane void region 130 need not necessarily be recognized as a single "line" (a row of surface voids 138); one in-plane void region 130 may be formed as an aggregate of parallel "lines" arranged in mutually close proximity.

Figure 4:
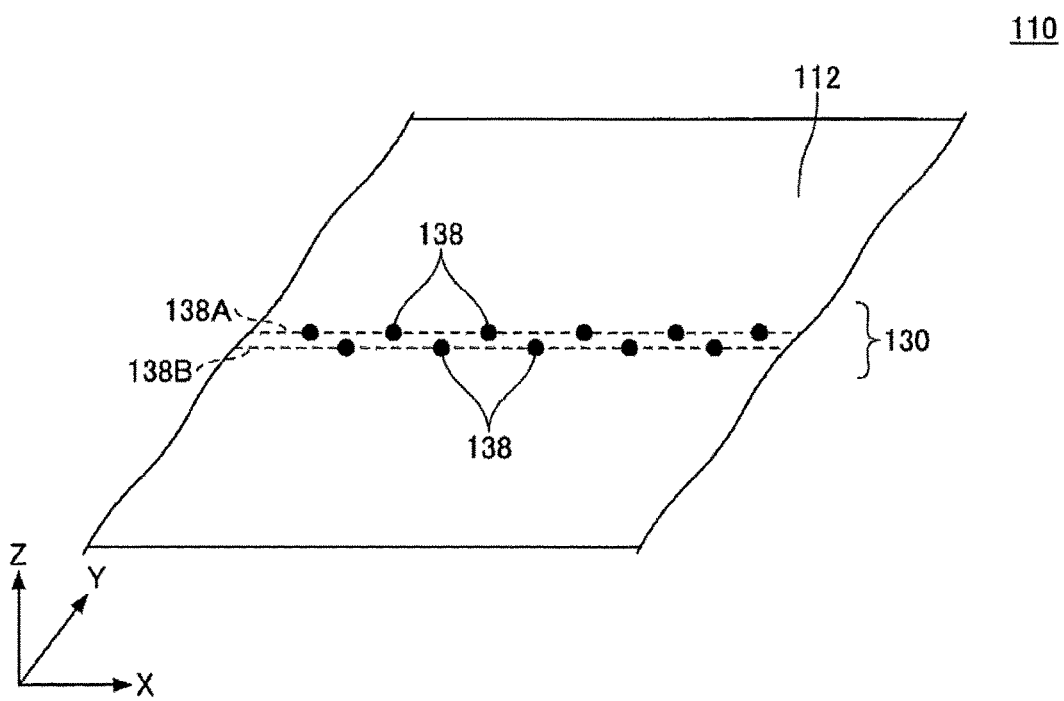
FIG. 4 is a diagram schematically illustrating a configuration of an in-plane void region.

FIG. 4 depicts an example of the in-plane void region 130 recognized as an aggregate of two or more such "lines". In this example, two surface void rows 138A and 138B parallel to each other are formed on the first main surface 112 of the glass material 110, thereby forming one in-plane void region 130. The distance between the surface void rows 138A and 138B is, for example, 5 μm or less, and is preferably 3 μm or less.

In the example of FIG. 4, the in-plane void region 130 is composed of two surface void rows 138A and 138B. However, the in-plane void region 130 may be composed of a large number of surface void rows.

Hereinafter, such an in-plane void region composed of two or more surface void rows is specifically referred to as a "multiple line in-plane void region". In addition, the in-plane void region 130 composed of one surface void row as depicted in FIG. 3 is specifically referred to as a "single line in-plane void region" to be distinguished from "multiple line in-plane void region".

The in-plane void region 130 and the internal void row 150 as described above may be formed by irradiating the first main surface 112 of the glass material 110 with a laser.

More specifically, first, a laser is applied to a first position of the first main surface 112 of the glass material 110 to form a first internal void row including surface voids from the first main surface 112 to the second main surface 114. Next, the laser application position with respect to the glass material 110 is changed such that a laser is applied to a second position of the first main surface 112 of the glass material 110 to form a second internal void row including second surface voids from the first main surface 112 to the second main surface 114. The in-plane void region 130 and the corresponding internal void rows 150 may be formed by repeating this operation.

In a case where an internal void row having voids 158 sufficiently close to the second main surface 114 is not formed by one laser application, that is, the void closest to the second main surface 114 among the voids 158 is still at a position sufficiently remote from the second main surface 114 (e.g., the void closest to the second main surface 114 is of a distance equal to or less than a half of the thickness of the glass material 110 from the first main surface 112), a laser may be applied twice or more to substantially the same position. Note that the "substantially the same (laser application) position" indicates not only a case where the two positions perfectly match but also indicates a case where the two positions may slightly be deviated from each other (e.g., a deviation of 3 μm at maximum).

For example, a laser is applied two or more times along a first direction parallel to the first main surface 112 of the glass material 110, such that the laser forms a first in-plane void region 130 and a corresponding internal void row 150 (first pass), and subsequently, a laser is applied to substantially the same direction and substantially the same position as the first pass (second pass), thereby forming a "deeper" internal void row 150 corresponding to the first in-plane void region 130.

Note that in a case where such a pass is repeated, the possibility of the obtained in-plane void region 130 becoming the "multiple line in-plane void region" may increase.

The distance from the center of the void closest to the second main surface 114, among the voids 158 constituting the internal void row 150, to the second main surface 114 may preferably be in a range of 0 to 10 μm although such a distance may vary with the thickness of the glass material 110.

As a laser that may be used for such a process, a short pulsed-laser with a pulse width from an order femtoseconds to an order of nanoseconds, i.e., $1.0 \times 10^{-15}$ to $9.9 \times 10^{-9}$ seconds may be given. Such a short pulsed-laser may further preferably be of a burst of pulses because internal voids may be efficiently formed. The mean power at the irradiation time of such a short pulsed-laser is, for example, 30 W or more. When this mean power of the short pulsed-laser is less than 10 W, sufficient voids may fail to be formed. As an example of laser light with a burst of pulses, a burst laser having a pulse number of 3 to 10 may be applied to form one internal void row; the laser power is approximately 90% of the power rating (50 W), the burst frequency is approximately 60 kHz, and the burst time width is 20 picoseconds to 165 nanoseconds. As a time width of the burst, a preferable range may be from 10 nanoseconds to 100 nanoseconds.

As a laser irradiation method, a method using self-convergence of beam based on the Kerr effect, a method using a Gaussian-Bessel beam together with axicon lens, or a method using a linear focusing beam with aberration lens may be used. In any case, any method may be used insofar as an in-plane void region and an internal void row are formed.

For example, when a burst laser apparatus (Patent Document 2) is used, the dimensions of each of the voids forming the internal void row 150, the number of voids included in the internal void row 150, and the like may be changed to some extent by appropriately changing the irradiation conditions of a laser.

In the following description, it is assumed that a plane (a plane 170 indicated by hatching in FIG. 3) including the in-plane void region 130 and the internal void rows 150 corresponding to the in-plane void region 130 may also be referred to as a "virtual end face". This virtual end face 170 substantially corresponds to the end face of the glass article produced by the first production method.

Figure 5:
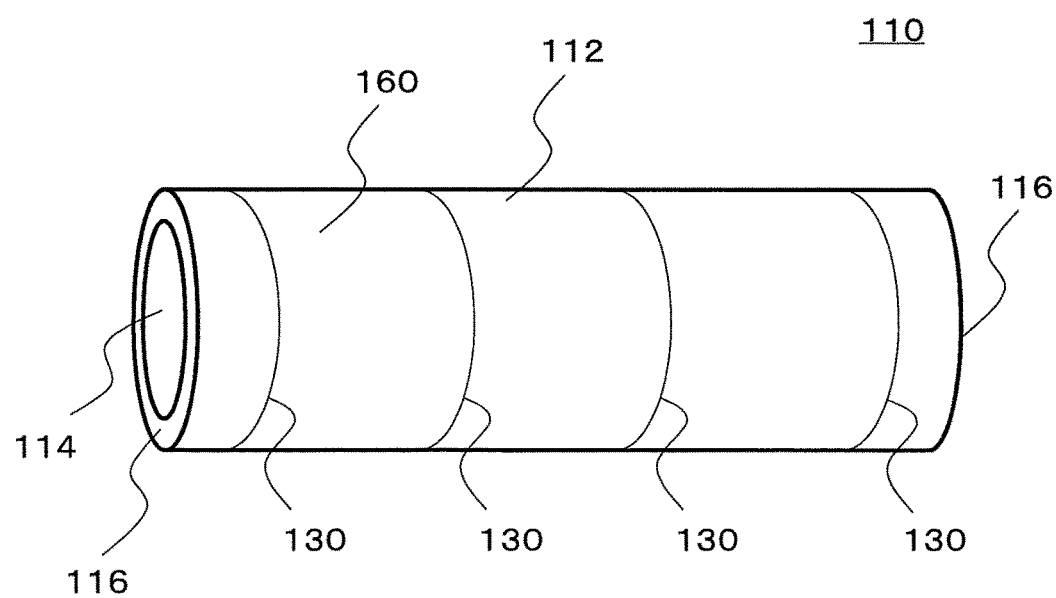
FIG. 5 is a diagram schematically illustrating a configuration of two or more in-plane void regions formed on a first main surface of a glass material.

FIG. 5 schematically illustrates an example of a configuration of the glass material 110 having two or more in-plane void regions 130 formed on the first main surface 112 of the glass material 110 in step S120.

In the example of FIG. 5, four in-plane void regions 130 are formed on the first main surface 112 of the glass material 110 in a tube axis direction. Further, though not viewable from FIG. 5, two or more internal void rows each having one or more voids intermittently arranged toward the second main surface 114 are formed below each in-plane void region 130, that is, nearer the second main surface 114.

Virtual parts bounded within the four in-plane void regions 130 with the corresponding internal void rows, that is, the three virtual parts bounded by the virtual end faces are each referred to as a "glass piece 160".

The shape of the in-plane void region 130, and the shape of the glass piece 160 substantially may correspond to the shape of a glass article obtained after step S140. For example, in the example of FIG. 5, three tubular glass articles are ultimately produced from the glass material 110. Furthermore, as described above, each of the virtual end faces including the in-plane void region 130 and the corresponding internal void rows 150 corresponds to one end face of the glass article produced after step S140.

Note that the in-plane void regions 130 and the arrangement configuration of the glass pieces 160 depicted in FIG. 5 are merely examples, and these are formed in a predetermined arrangement according to the shape of the finally produced glass articles.

Figure 6:
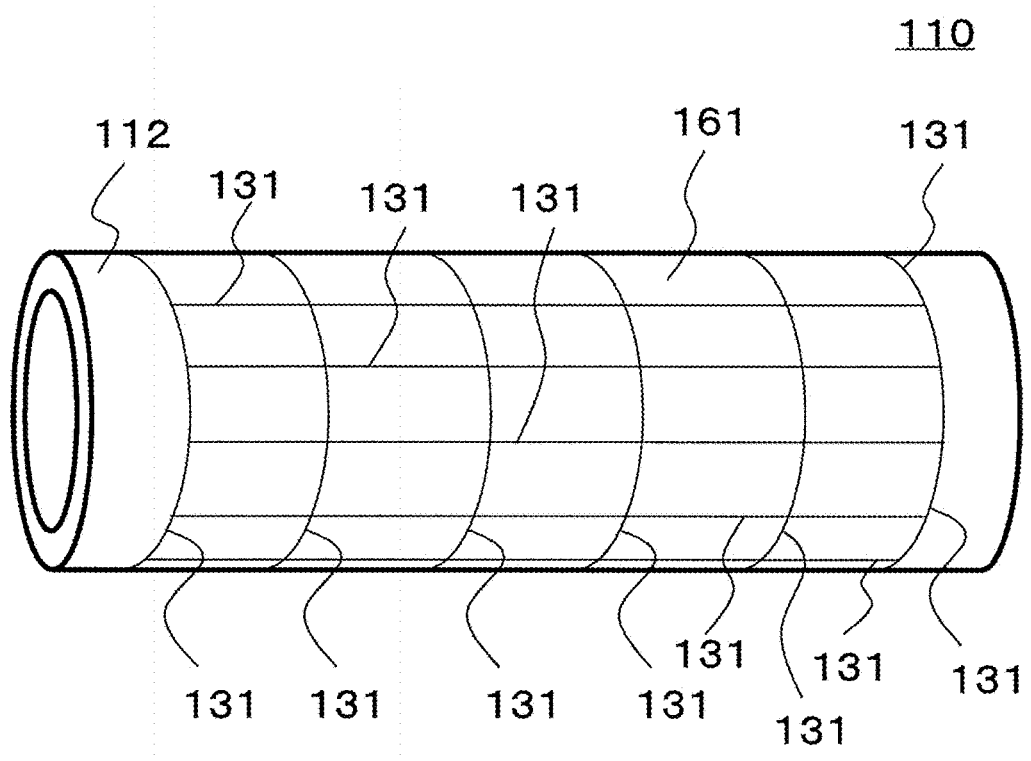
FIG. 6 is a diagram schematically illustrating a configuration of an in-plane void region.
Figure 7:
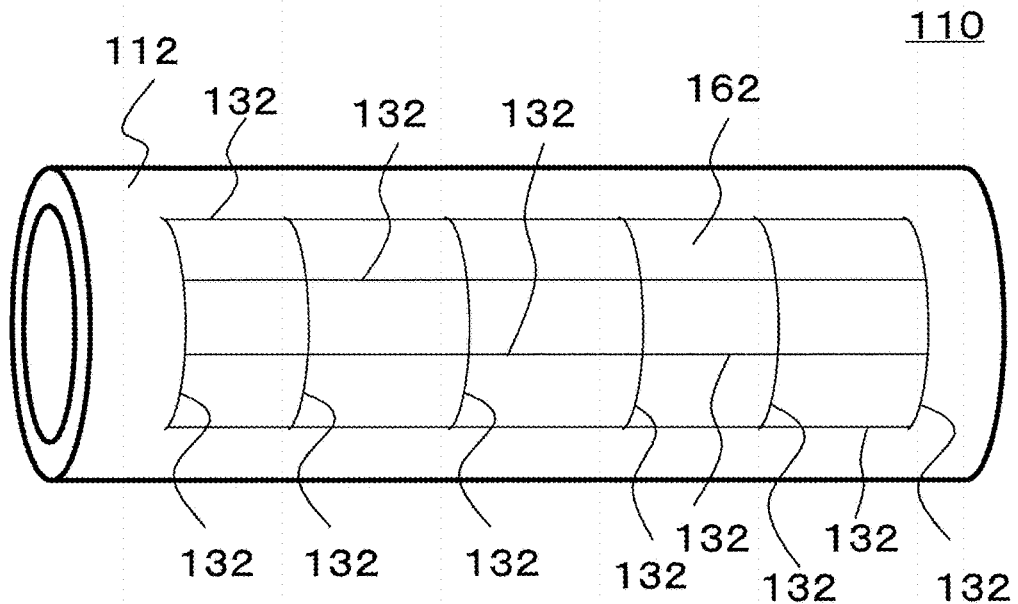
FIG. 7 is a diagram schematically illustrating another configuration of an in-plane void region.

FIG. 6 and FIG. 7 schematically illustrate respective examples of another configuration of the in-plane void region.

In the example of FIG. 6, each of the in-plane void regions 131 is arranged in a tube axis direction and a direction orthogonal to the tube axis direction. As a result, a glass piece 161 having a curved shape with a certain curvature may be obtained from the tubular material.

In the example of FIG. 7, each of the in-plane void regions 132 is disposed on a portion of the surface of the glass tube.

Note that the in-plane void regions 130, 131, and 132 may be formed in a linear shape, a curved shape, or a combination of both.

(Step S120)

Next, the glass material 110 is chemically strengthened.

The conditions of the chemical strengthening treatment were not particularly specified. The chemical strengthening may be performed, for example, by immersing the glass material 110 in a molten salt at 430 to 500° C. for 1 minute to 2 hours.

For the molten salt, nitrate may be used. For example, when replacing the lithium ions contained in the glass material 110 with larger alkali metal ions, a molten salt containing at least one of sodium nitrate, potassium nitrate, rubidium nitrate, and cesium nitrate may be used. Further, when replacing the sodium ions contained in the glass material 110 with larger alkali metal ions, a molten salt containing at least one of potassium nitrate, rubidium nitrate, and cesium nitrate may be used. Moreover, when replacing the potassium ions contained in the glass material 110 with larger alkali metal ions, a molten salt containing at least one of rubidium nitrate and cesium nitrate may be used.

In addition, one or more salts such as potassium carbonate may be further added to the molten salt. In this case, a low density layer having a thickness of 10 nm to 1 μm may be formed on the surface of the glass material 110.

The application of a chemical strengthening treatment to the glass material 110 will form a compressive stress layer on the first main surface 112 and the second main surface 114 of the glass material 110, resulting in improving the strength of the first main surface 112 and the second main surface 114. The thickness of the compressive stress layer corresponds to the penetration depth of alkali metal ions for substitution. For example, when replacing sodium ions with potassium ions using potassium nitrate, the thickness of the compressive stress layer for soda-lime glass may be 8 to 27 μm, and the thickness of the compressive stress layer for aluminosilicate glass may be 10 to 100 μm. In a case of aluminosilicate glass, the penetration depth of alkali metal ions may preferably be 10 μm or more, and may more preferably be 20 μm or more.

The chemical strengthening treatment is typically applied to the first main surface and the second main surface. However, for example, in a case where the improvement of only the quality of the outside of the glass article is desirable, only the first main surface may be chemically strengthened. In the chemical strengthening treatment of the first main surface, for example, both end portions of the glass material 110 may be sealed such that the molten salt does not come into contact with the inside of the glass material 110.

As described above, in the related-art production method of a chemically strengthened glass article, a glass article is produced through the following steps:

(I) preparing a large-sized tubular glass material;

(II) cutting and acquiring a large number of glass tubes having a product shape from the large-sized tubular glass material; and (III) chemically strengthening the acquired glass tubes.

In contrast, in the first production method, a chemical strengthening treatment is applied to the glass material 110 as a treatment subject. In this case, unlike the related-art production method of a chemically strengthened glass article having a product shape, handling of the treatment subject at the time of the application of a chemical strengthening treatment will be facilitated.

For example, in a case where the end face 116 (see FIG. 5) of the glass material 110 is scratched, this scratched part is not included in the finally produced glass article. Further, at the time of the application of a chemical strengthening treatment, it is possible to support or grip a treatment subject by utilizing, for example, the outer peripheral portion of the glass material 110 that is not used as a glass article.

Hence, in the first production method, it is easier to ensure the quality of appearance and strength related to scratches on the glass article to be produced, as compared with the related-art production method, which makes it possible to increase the producing yield. In addition, in the first production method, the glass material 110 may be chemically strengthened as a treatment subject; hence, it is easy to chemically strengthen only the first main surface.

Note that in the first production method, the chemical strengthening treatment is applied to the glass material 110 before forming the shape of the glass article. Accordingly, the glass article obtained after the separating step S140 may have an end face that is not chemically strengthened. In this case, the glass article may fail to acquire sufficient strength.

However, the inventors of the present invention have found that after the step S130 of the first production method, that is, in the glass material 110 after the application of a chemical strengthening treatment, alkali metal ions (hereinafter referred to as "introduced ions") introduced by the chemical strengthening treatment are also present on the virtual end face (i.e., the end face of the cut glass article).

As will be described later, unlike at least the first main surface 112, in the virtual end face, the introduced ions exhibit non-uniform concentration distribution in a plane, representing that the closer to the central portion in the thickness direction of the glass material 110, the lower the concentration of the introduced ions. However, alkali metal ions introduced through the chemical strengthening treatment are present on the entire virtual face, and the introduced ions are also present in the central portion in the thickness direction. Accordingly, the concentration of the introduced ions present in the central portion in the thickness direction is not zero.

This suggests that in the first production method, a molten salt is introduced into the glass material 110 via the fine surface voids 138 formed on the surface of the glass material 110 by the laser irradiation and via the fine voids 158 formed inside the glass material 110, and that a substitution reaction occurs between the introduced molten salt and the virtual end face. Such an outcome has not been reported insofar as the applicant knows.

As a result of supporting this outcome, the glass article produced through the first production method, that is, the steps S110 to S140, has sufficient strength compared to that of a glass article produced through the aforementioned steps (I) to (III). Details will be described later.

According to the first production method, it is possible to obtain, after the step S130, the glass material 110 having at least the first main surface 112 and respective virtual end faces all of which have been chemically strengthened. For the second main surface 114, chemical strengthening treatment is applied as required.

(Step S140)

Next, glass articles (e.g., not-illustrated glass articles 180) are separate from the chemically strengthened glass material 110 (e.g., a not-illustrated glass tube 175).

When separating glass articles 180 from a glass tube 175, the aforementioned virtual end faces are utilized. In other words, the glass pieces 160 bounded by the virtual end faces are separated from the glass tube 175 to produce the glass articles 180.

As mentioned above, it is difficult to separate the glass article from the glass tube 175, because the chemically strengthened glass material typically has the strengthened first and second main surfaces.

However, in the first production method, the virtual end face of the glass tube 175 has the surface voids 138 and voids 158 that are contained in the in-plane void region 130 and the corresponding internal void row 150 in a plane. As a result, when separating the glass articles 180 from the glass tube 175, these voids 138 and 158 play a role such as "perforation formed in a plane and inside" of the virtual end faces of the glass tube 175. Accordingly, in the first production method, it is possible to easily separate the glass articles 180 from the glass tube 175 by using the virtual end faces. In particular, in a case where the in-plane void region 130 is a "multiple line-in-plane void region", the glass articles 180 may be separated more easily.

Note that, as described above, the in-plane void region 130 is composed of two or more voids 138, and the internal void row 150 is composed of two or more voids 158. The in-plane void region 130, the internal void row 150, and the voids 138 and 158 are different from through holes formed so as to penetrate the glass tube in the thickness direction of the glass tube, for example.

As described above, a chemical strengthening treatment is also applied to the virtual end faces of the glass tube 175. Thus, the resulting glass articles 180 also have chemically strengthened end faces 186. Hence, the first production method may be able to avoid a problem in a method in which glass articles are separated from the conventional glass material after the conventional glass material is chemically strengthened; that is, since the conventional glass material has the end faces that are not chemically strengthened, the glass articles may have insufficient strength.

A specific method for performing step S140 is not particularly specified. For example, one or more glass articles 180 may be separated from the glass tube 175 by a mechanical method or a thermal method.

For example, a method of separating a glass article from a glass tube 175 is performed by applying a pressure to the first main surface of the glass tube 175 in an intra-tubular direction of the glass tube. In order to apply pressure in a direction to push the glass tube against the entire first main surface of the glass tube, pressure is applied by placing the glass tube in a cylindrical metal container larger than the glass tube. In this case, the first main surface of the glass tube is covered with an elastic body having a larger Poisson's ratio than that of the glass so as to facilitate separation of the glass articles after application of pressure. Note that the elastic body may be urethane rubber or Teflon (registered trademark) resin.

To separate one or more glass articles 180 from the glass tube 175 by a thermal method, a "surface absorption method" or an "internal absorption method" may be used.

In the "surface absorption method", the first main surface 112 of the glass tube 175 is locally heated using a heat source to generate thermal stress, thereby separating the glass articles 180 from the glass tube 175. As the heat source, for example, a laser having a relatively long wavelength (e.g., a $CO_2$ laser), a burner, a heater wire, or the like is used. Concentrating the heat from the heat source in the in-plane void region 130 generates thermal stress in the in-plane void region 130 and furthermore in the virtual end faces, thereby breaking the glass tube 175 along these virtual end faces. Thereby, the glass articles 180 may be separated.

In the "internal absorption method", a laser having a relatively short wavelength (e.g., a CO laser) is used. When such a laser is applied to the glass tube 175, the heat of the laser is absorbed inside the glass tube 175. Accordingly, the application of the laser along the in-plane void region 130 will locally generate an internal stress in the virtual end face to be broken from the other portion. As a result, the glass article 180 is separated from the glass tube 175.

To typically separate a glass article from a glass material, a glass material is cut using a glass cutter or the like. In this case, the end face of the glass article tends to be a "rough" end face having unevenness.

In the first production method, a cutting tool such as a glass cutter is not necessarily used for separating the glass article 180, which indicates that a relatively smooth end face 186 may be obtained when separating the glass article 180.

Note that in particular cases, such as when a smooth end face 186 is not required, the glass article 180 may be separated by cutting the glass tube 175 along the virtual end face using a glass cutter or the like. In this case, the presence of the virtual end face may also facilitate cutting of the glass tube 175 more easily than normal cutting.

Through the above steps, one or more glass articles 180 may be produced. Note that in order to protect the end face 186 of the obtained glass article 180, a material such as resin may be applied to the end face 186.

In the first production method, due to the above-mentioned characteristics, it is possible to significantly reduce deterioration in appearance quality of the glass article 180 and obtain a glass article 180 having sufficient strength.

As described above, one production method for producing a glass article has been described by taking the first production method as an example. However, the first production method is merely an example, and various modifications may be made when actually producing a glass article.

For example, the chemical strengthening treatment in step S130 of the first production method is not necessarily applied to both the first main surface 112 and the second main surface 114 of the glass material 110; a modified method may be considered where the chemical strengthening treatment is not applied to one of the first main surface 112 and the second main surface 114 of the glass material 110.

Further, for example, a step (additional step) of providing various characteristics to the glass tube 175 may be performed after the step S130 and before the step S140.

The additional step is not particularly specified to the above-described step; for example, the additional step may be performed to add an additional characteristic such as a protection function to the surface of the glass tube 175 or to modify the surface of the glass tube 175.

Such additional steps may include, for example, a step of attaching a functional film to the first main surface 112, the second main surface and/or the end surface 116 (hereinafter collectively referred to as "exposed surface") of the glass tube 175, and a step of applying surface treatment (including surface modification) to at least a part of the exposed surface, and the like.

Examples of the surface treatment method include etching treatment, film formation treatment, printing treatment and the like. The film formation treatment may be performed using, for example, a coating method, a dipping method, a vapor deposition method, a sputtering method, a PVD method, a CVD method, or the like. Note that the surface treatment includes washing using a chemical solution.

By surface treatment, for example, a wavelength selective film such as a low reflective film, a high reflective film, an IR absorbing film or a UV absorbing film, an anti-glare film, an anti-fingerprint film, an anti-fogging film, a printing, an electronic circuit, and a multilayered film of these may be formed.

Furthermore, grooves may be formed in at least one of the main surfaces of the glass material 110 before or after step S120, or both before and after step S120, that is, before or after formation of the in-plane void region 130, or both before and after formation of the in-plane void region 130.

For example, when the in-plane void region 130 is already formed on the first main surface 112 of the glass material 110, grooves may be formed along the in-plane void region 130. Alternatively, when the in-plane void region 130 is yet to be formed on the first main surface 112 of the glass material 110, grooves may be formed along the in-plane void region 130 to be formed at a later time.

The shape of the groove is not particularly specified. For example, the groove may have a substantially V-shaped cross section, a substantially U-shaped cross section, a substantially inverted trapezoidal shape, a substantially square-recessed shape, or the like. Further, in the configuration of these grooves, an opening portion of the groove in the first main surface 112 or the second main surface 114 may be round.

In a case of forming grooves having such a cross-sectional shape, the glass article 180 obtained after step S140 has a connecting portion of the end face 186 with the first main surface 112 and/or the second main surface 114 that is chamfered or rounded. Accordingly, a post-processing step with respect to the glass article 180 may be omitted.

The depth of the groove may, for example, be less than a half of the thickness of the glass material 110. The depth of the groove is preferably 0.01 mm or more.

The tool for forming the groove may be, for example, a grindstone, a laser, or the like. In particular, from the viewpoint of accuracy and quality of the groove, laser processing is preferable.

(Glass Tube Production Method According to One Embodiment of the Present Invention)

In the following, a method for producing a glass tube according to an embodiment of the present invention will be described with reference to FIG. 8.

Figure 8:
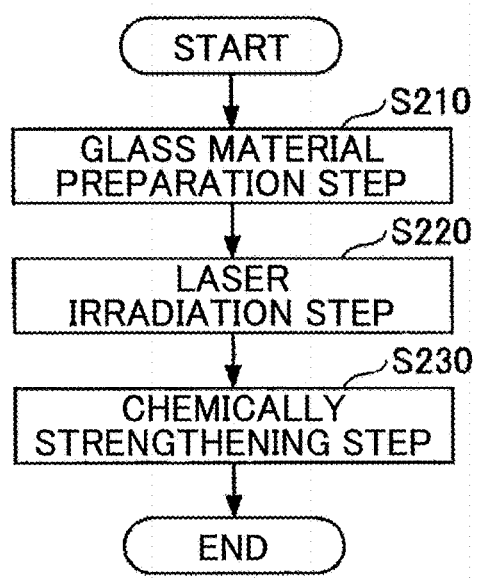
FIG. 8 is a flowchart schematically illustrating a method for producing a glass tube according to an embodiment of the present invention.

FIG. 8 schematically illustrates a flow of a method for producing a glass tube (hereinafter referred to as a "second production method") according to an embodiment of the present invention.

As illustrated in FIG. 8, the second production method includes a step of preparing a tubular glass material (glass material preparation step) (step S210);

a step of irradiating a first main surface of the glass material with a laser to form an in-plane void region in the first main surface and to form an internal void row inside the glass material (laser irradiation step) (step S220); and a step of chemically strengthening the glass material (chemical strengthening step) (step S230).

As is apparent from FIG. 8, this second production method corresponds to the above-described first production method illustrated in FIG. 1 from which the separation step of step S140 is omitted.

That is, in this second production method, as the glass tube, a glass material having one or more virtual end faces, that is, in-plane void regions and corresponding internal void rows as illustrated in FIGS. 5 to 7 is produced.

In other words, in the present application, a "glass tube" indicates an intermediate body in steps of producing the glass articles from the glass material, that is, a processed glass material.

Such a "glass tube" is useful in a case where the steps of processing the glass material (e.g., step S210 to step S230) and the step of separating the glass article from the glass tube are performed by different persons or in different places, or in a case where these steps are performed at appropriate intervals in time.

It should be apparent to those skilled in the art that effects similar to those obtained in the above-described first production method may also be obtained in such a second production method. That is, in the glass tube obtained by the second production method, the virtual end face is chemically strengthened, and when the glass article is separated from the glass tube, a glass article having sufficient strength may be obtained. In addition, there is a significant control against deterioration of the quality of the obtained glass article.

(Glass Article According to One Embodiment of the Present Invention)

Next, a glass article according to an embodiment of the present invention will be described with reference to FIG. 9.

Figure 9:
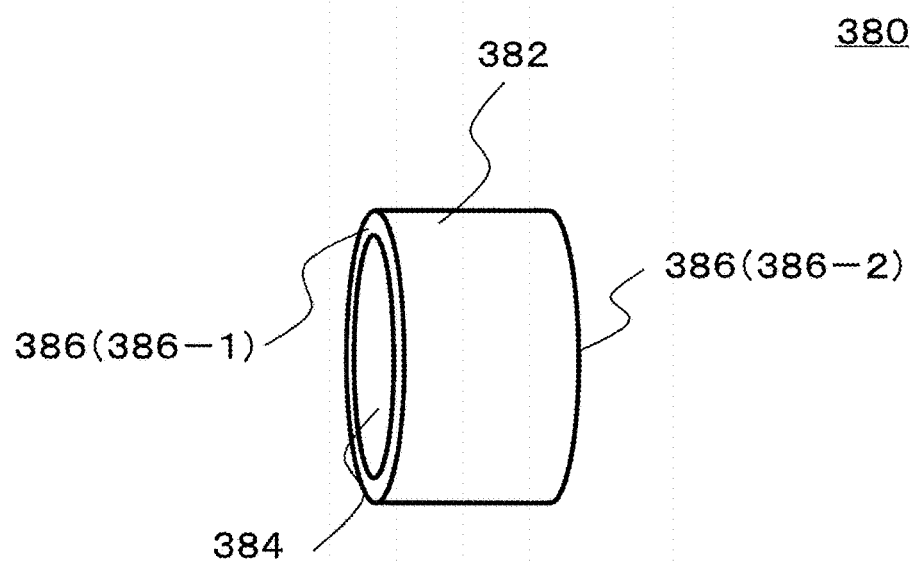
FIG. 9 is a diagram schematically illustrating a glass article according to an embodiment of the present invention.

FIG. 9 schematically illustrates a glass article (hereinafter referred to as "first glass article") according to an embodiment of the present invention.

As illustrated in FIG. 9, a first glass article 380 has a first main surface 382 and a second main surface 384 and end surfaces 386 connecting the two main surfaces. Note that the first main surface 382 corresponds to the first main surface of the glass material and the main outside surface of the glass material and the second main surface 384 corresponds to the second main surface of the glass material and the main inside surface of the glass material.

However, this form may merely be an example; various forms may be assumed as the configuration of the first glass article 380. For example, the first main surface 382 and the second main surface 384 may be in the shape of a circle, an ellipse, a triangle, or a polygon other than a rectangle. Further, an end face 386 may extend obliquely. In this case a "tilted" end face is obtained.

The thickness of the first glass article 380 is not particularly specified. The thickness of the first glass article 380 may be, for example, in a range of 0.1 to 10 mm.

Note that in the first glass article 380, at least the first main surface 382 is chemically reinforced, and the second main surface 384 is chemically reinforced as required. Further the first glass article 380 has a chemically strengthened end face 386.

However, a chemically strengthened state may differ between the main surfaces 382, 384 and an end face 386, that is, a distribution state of introduced ions (alkali metal ions introduced by a chemical strengthening treatment) may differ between the main surfaces 382, 384 and an end face 386.

This difference will be described in more detail with reference to FIG. 10. Note that in the following, an example of the chemical strengthening treatment applied to the first main surface and the second main surface will be described.

Figure 10:
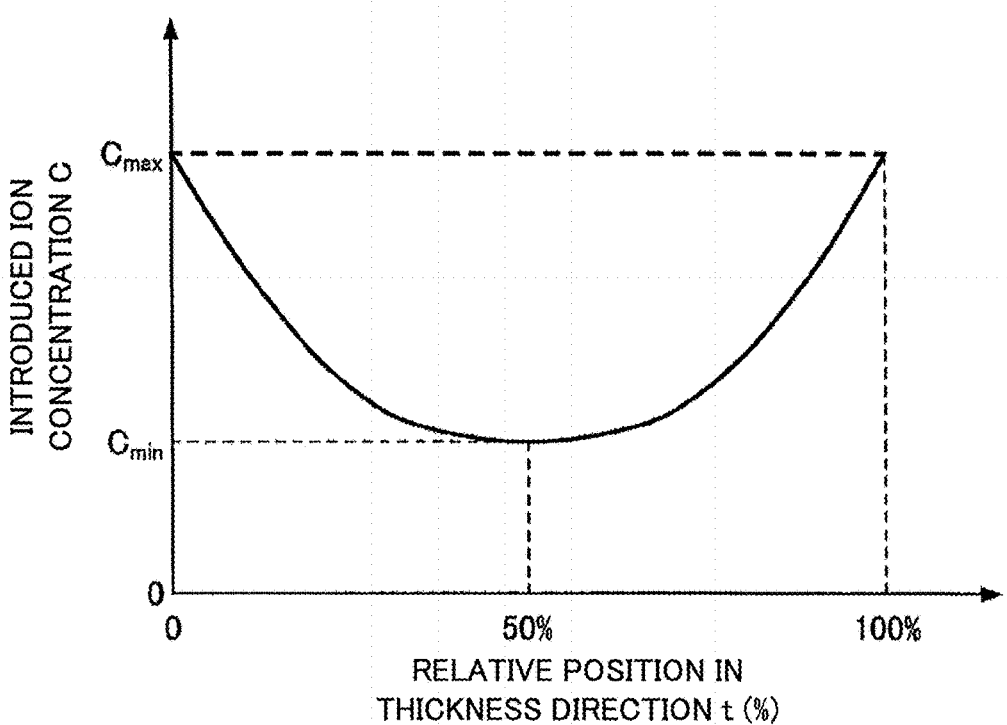
FIG. 10 is a diagram schematically illustrating a concentration profile of introduced ions in a thickness direction on one end face of a glass article according to an embodiment of the present invention.

FIG. 10 schematically depicts the concentration profile of the introduced ions in the thickness direction (Z direction) at one end face 386 (e.g., 386-1) of the first glass article 380. In FIG. 10, the horizontal axis indicates the relative position t (%) in the thickness direction, the first main surface 382 side corresponds to t=0%, and the second main surface 384 side corresponds to t=100%. The vertical axis indicates the concentration C of the introduced ions. As described above, the introduced ions indicates alkali metal ions introduced by the chemical strengthening treatment, that is, alkali metal ions to provide a compressive stress layer to the first main surface and the second main surface of the glass article for improving the strength of the main surfaces.

This concentration C is calculated by subtracting the concentration of alkali metal ions which are of the same type as the introduced ions contained in portions other than the main surfaces 382, 384 and the end surfaces 386-1 to 386-2 of the glass article 380, that is, by subtracting the concentration of alkali metal ions in the bulk portion of the glass article 380 (hereinafter referred to as "bulk concentration"). Accordingly the bulk concentration is approximately the same as the arithmetic mean concentration of alkali metal ions with respect to the volume of the glass material before the application of a chemical strengthening treatment.

Note that the concentration profile as illustrated in FIG. 10 may be measured at each in-plane position of the end face 386-1. However, insofar as the measured position is within the same end face 386-1 of the glass article 380, the tendency of the concentration evaluated at any position within the same end surface profile will be almost the same regardless of the position of the end face 386-1.

As illustrated in FIG. 10, in the end face 386-1, the concentration C of the introduced ions along the thickness direction indicates a profile larger at the entire end face relative to the bulk concentration, which indicates a substantially parabolic profile in this example. That is, the concentration C of the introduced ions tends to indicate the maximum value $C_{max}$ on the first main surface 382 side (t=0%) and the second main surface 384 side (t=100%), and tends to indicate the minimum value $C_{min}$ at the central portion (t=50%) in the thickness direction. Here, the minimum value $C_{min}>0$.

Note that the shape of the concentration profile of the introduced ions varies with the thickness, material, producing conditions (conditions of chemical strengthening treatment, etc.), and the like of the first glass article 380. However, in any condition, the bulk concentration is larger at the entire end face, and such a substantially parabolic profile is generated as one example. However, due to the effect of the chemical strengthening treatment method or the like, it is often accepted that the concentration C of the introduced ions does not match exactly at the first main surface 382 side (t=0%) and at the second main surface 384 side (t=100%). That is, it is frequently observed that the concentration C becomes $C_{max}$ only on one of the main surfaces. The substantially parabolic profile here is different from the mathematical definition of a parabola; the concentration C of the introduced ions increases at least on the first main surface side with respect to the central portion in the thickness direction, and the introduced ion concentration in this concentration profile is equal to or higher than the bulk concentration of the glass article.

Note that when concentration (atomic ratio) of introduced ions normalized by silicon ions, that is, (the concentration C of the introduced ions)/(the concentration of the Si ions) is determined to be Cs, the ratio of the minimum value of Cs at the target end face to the Cs in the bulk is preferably 1.6 or more, more preferably 1.8 or more, and further preferably 2.2 or more.

In the first main surface 382 and the second main surface 384, the concentration of the introduced ions is substantially constant in a plane, and the concentration profile of such an end surface 386-1 is a distinct feature. In addition, a first glass article 380 having such a chemically strengthened end face 386 has not been recognized in the known technology.

For example, in a case where a glass article of a product shape is cut out from a glass material and the glass article is chemically strengthened, the concentration of the introduced ions at the end face of the obtained glass article is substantially constant in a plane. In that case, typically a profile as indicated by the broken line in FIG. 10 is obtained. That is, $C=C_{max}$ regardless of position. For example, when a glass article of product shape is cut out after the chemical strengthening treatment of a glass material, almost no introduced ions are detected on the end face of the obtained glass article. That is, $C\approx 0$.

The first glass article 380 has an end face 386 having such a characteristic concentration profile of introduced ions. Accordingly, the first glass article 380 has an excellent strength compared to a glass article obtained by cutting out a conventional chemically strengthened glass material.

The surface compressive stress of the first main surface 382 and the second main surface 384 of the first glass article 380 is, for example, in a range of 200 to 1000 MPa, and preferably in a range of 500 to 850 MPa. The surface compressive stress of the end surfaces 386-1 to 386-4 (not illustrated) of the first glass article 380 has a minimum value of more than 0 MPa, for example, is in a range of 25 to 1000 MPa or more, preferably 50 to 850 MPa, and more preferably 100 to 850 MPa. Note that the surface compressive stress may be measured by for example, a surface stress measuring apparatus FSM-6000LE or FSM-7000H produced by Orihara Manufacturing Co., Ltd. using a photoelastic analysis method.

In a case where the chemical strengthening treatment is applied only to the first main surface, the distribution appears only in a region on the left side with respect to the longitudinal symmetry axis in the substantially parabolic curve in FIG. 10. In such a case, the molten salt permeates from the end face side in the vicinity of the second main surface, and the concentration of the introduced ions becomes higher than at least the bulk introduced ion concentration (bulk concentration).

Note that the first glass article 380 may include one or two or more additional members on the first main surface 382, the second main surface 384, and/or the end surface 386.

Such additional members may be provided in the configuration of, for example, layers, membranes, films, and the like. Furthermore, such additional members may be provided on the first main surface 382, the second main surface 384, and/or the end surface 386 to develop functions such as low reflective properties and protection.

The first glass article 380 may be applied to an electronic apparatus (e.g., an information terminal apparatus such as a smartphone or a display), a cover glass of a camera or a sensor, architectural glass, glass for industrial transportation equipment glass apparatus for biomedical use and the like.

(Glass Tube According to One Embodiment of the Present Invention)

Next, a glass tube according to an embodiment of the present invention will be described with reference to FIG. 11.

Figure 11:
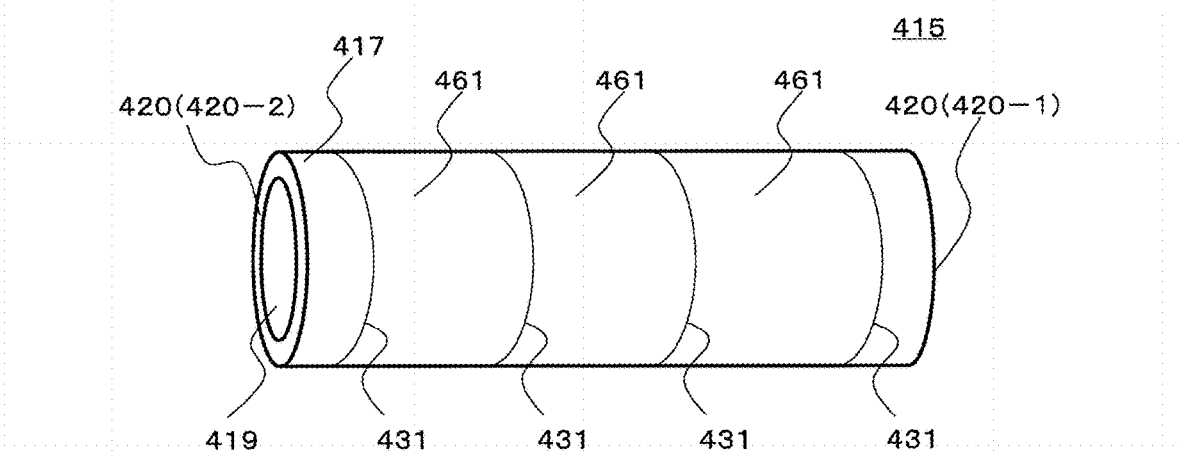
FIG. 11 is a diagram schematically illustrating a glass tube according to an embodiment of the present invention.

FIG. 11 schematically illustrates a glass tube (hereinafter referred to as "first glass tube") according to an embodiment of the present invention.

As illustrated in FIG. 11, a first glass tube 415 includes a first main surface 417 and a second main surface 419, and two end surfaces 420 (420-1 to 420-2) connecting the first main surface 417 and the second main surface 419. Note that the first main surface 417 corresponds to the first main surface and the outer main surface of the glass material, and the second main surface 419 corresponds to the second main surface and the inner main surface of the glass material.

A glass composition of the first glass tube 415 is not particularly specified insofar as the glass composition is capable of being chemically strengthened. The first glass tube 415 may be, for example, soda-lime glass, aluminosilicate glass, alkali aluminosilicate glass or the like.

The thickness of the first glass tube 415 is not particularly specified; the thickness of the glass material may be in a range of 0.1 to 10 mm, for example.

The first glass tube 415 has two or more in-plane void regions 431 on the first main surface 112, and two or more internal void rows (not viewable) are formed below (toward the second main surface) each in-plane void region 431. The internal void rows may extend parallel to the thickness direction (Z direction) of the first glass tube 415 or may be inclined with respect to the thickness direction of the first glass tube 415.

A portion bounded by respective in-plane void regions 431 and the corresponding internal void rows, that is, a portion bounded by the virtual end surfaces is referred to as a glass piece 461.

As is apparent from FIG. 11, the first glass tube 415 corresponds to the glass material 110 illustrated in FIG. 5 described above. Specifically, the first glass tube 415 is used as an intermediate body in a process until a glass article is produced from a glass material; in other words, the first glass tube 415 is used as a glass material before separating a glass article having a desired shape.

More specifically, in the first glass tube 415, it is possible to obtain a glass article (corresponding to the glass piece 461) by separating the glass piece 461 from the first glass tube 415 along the virtual end faces.

Such a "glass tube" is useful in a case where the step of producing the first glass tube 415 from the glass material and the step of separating the glass article from the first glass tube 415 are conducted by different persons or in different places, or in a case where these steps are performed at appropriate intervals in time.

With reference to FIGS. 12 to 15, the in-plane void regions 431 and the internal void rows included in the first glass tube 415 will be described in more detail.

Figure 12:
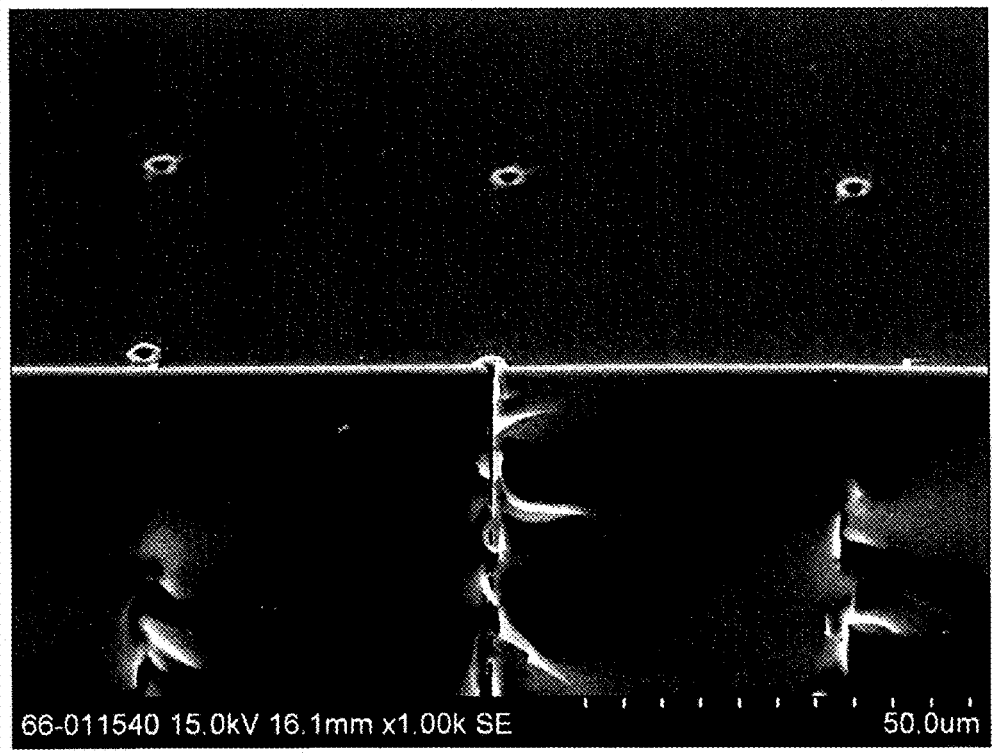
FIG. 12 is an SEM photograph illustrating examples of a first main surface and a cross section of a first glass tube.

FIG. 12 illustrates an example of a SEM photograph obtained from a glass plate corresponding to the first main surface 417 and a cross section of the first glass tube 415 illustrated in FIG. 11. In FIG. 12, an upper side corresponds to the first main surface 417 of the first glass tube 415, and the lower side corresponds to the cross section of the first glass tube 415.

In the first main surface 417 of the first glass tube 415, two rows of surface voids are formed in the horizontal direction, and each row corresponds to the in-plane void region 431 illustrated in FIG. 11. In this example, each surface void has a diameter of approximately 2 μm and the distance P between adjacent surface voids is approximately 50 μm.

An altered portion (whitish ring-shaped region) having a width of approximately 1 to 2 μm is formed around each surface void. This seems to be a residual stress portion formed by the components of the first glass tube 415 melting during laser irradiation and subsequent solidifying of the melted components.

The cross section of the first glass tube 415 is substantially cut along one in-plane void region 431 and the corresponding internal void rows. Hence, this cross section corresponds to the virtual end face of the first glass tube 415. Note that to be accurate, this cross section is formed by manual cutting, the cross section depicted does not include the leftmost surface voids. However, in FIG. 12, the configuration of the virtual end face may also be substantially identified. Hence, the cross-sectional portion in FIG. 12 will also be referred to as a virtual end face.

In FIG. 12, three internal void rows extending in vertical directions are observed in the depicted virtual end face. Referring to the most clearly observed central internal void row, two or more fine voids in this internal void row are arranged intermittently like "perforations". In the internal void example, several whisker-like cracks formed in an oblique direction, that is, the three whisker-like cracks observed in the central internal void row are due to the manual cutting, and are not internal voids.

Figure 13:
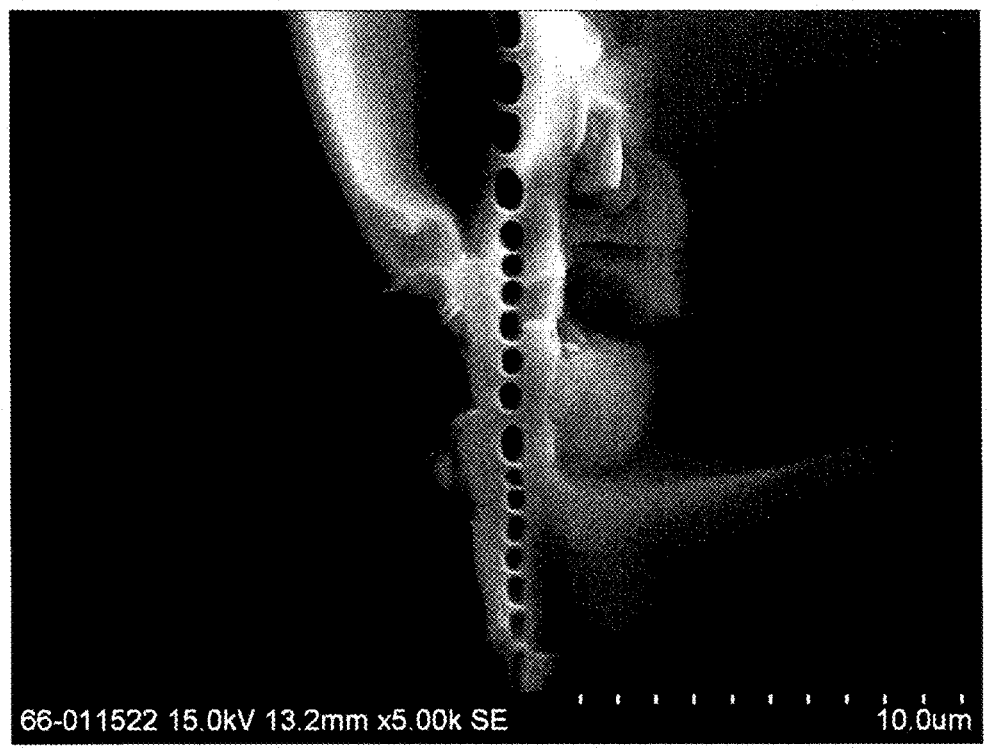
FIG. 13 is an SEM photograph illustrating an example of an internal void row in a virtual end face of a glass tube according to an embodiment of the present invention.

FIG. 13 depicts an example of a SEM photograph at another virtual end face corresponding to the first glass tube 415. In FIG. 13, an upper side corresponds to the first main surface 417 side of the first glass tube 415, and a lower side corresponds to the second main surface 419 side.

According to this photograph, a large number of voids are formed in a row in the virtual end face from the first main surface 417 toward the second main surface 419, thereby forming one internal void row.

In the photograph of FIG. 13, each void forming the internal void row has a maximum length (length in the longitudinal direction) of approximately 0.5 to 1.5 µm, and the shape of the void is substantially circular, substantially elliptical, substantially rectangular shape, and the like. The measure of the dividing walls between adjacent voids is approximately 0.2 to 0.5 µm.

Figure 14:
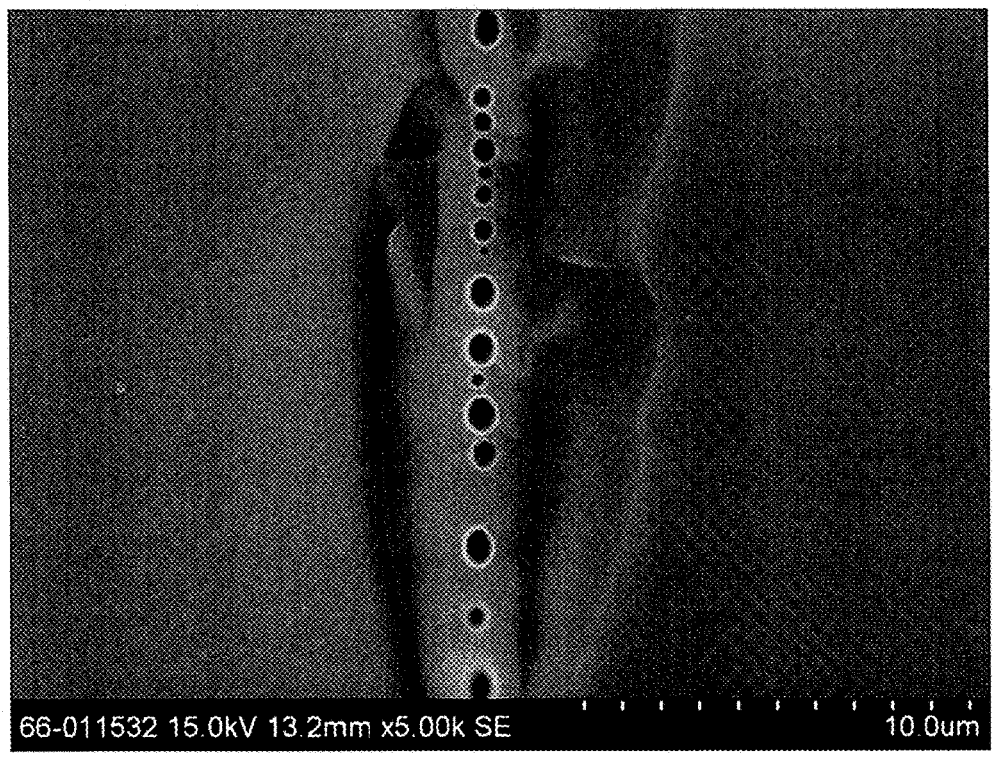
FIG. 14 is an SEM photograph illustrating an example of an internal void row in a virtual end face of a glass tube according to an embodiment of the present invention.
Figure 15:
FIG. 15 is an SEM photograph illustrating an example of an internal void row in a virtual end face of a glass tube according to an embodiment of the present invention.

FIGS. 14 and 15 each depicts an example of a SEM photograph at another virtual end face corresponding to the first glass tube 415.

In the example shown in FIG. 14, one internal void row formed in the virtual end face is composed of a void having a size of approximately 0.5 to 1.5 µm. The shape of the void is substantially circular or substantially elliptical. The measure of the dividing walls between adjacent voids is approximately 0.1 to 2 µm.

In the example depicted in FIG. 15, one internal void row formed in the virtual end face is composed of a long and thin void having a size of approximately 3 to 6 µm. The measure of the dividing walls between adjacent voids is approximately 0.8 µm.

As described above, the configuration of the internal void rows included in the virtual end face of the first glass tube 415, and further, the configuration of a group of voids (void group) forming the first void row is not particularly specified. The configuration of the void group may variously change with the glass composition of the first glass tube 415, laser irradiation conditions, and the like. Note that microcracks may be formed along the internal void row due to the stress at the time of void formation, and the group of voids may be connected by the microcracks to the extent that the glass material is not separated along the in-plane void region. This configuration may be preferable in view of penetration of the molten salt into the glass material during a chemical strengthening treatment. Typically, however, the size of the voids forming the internal void row in the direction along the internal void row is in a range of 0.1 to 1000 µm, preferably in a range of 0.5 to 100 µm, more preferably in a range of 0.5 to 50 µm. Further, the shape of the voids forming the internal void row may be rectangular, circular, elliptical, or the like. Furthermore, the thickness of the dividing walls between adjacent voids is typically in a range of 0.1 to 10 µm.

Similarly, the size of the surface voids forming the in-plane void region 431 may variously change with the glass composition of the first glass tube 415, the laser irradiation conditions, and the like.

The diameter of the surface voids is typically in a range of 0.2 to 10 µm, for example in a range of 0.5 to 5 µm. The distance P (see FIG. 3) between the centers of the adjacent surface voids is in a range of 1 to 20 µm, for example, in a range of 2 to 10 µm. The smaller the distance P between the centers of the adjacent surface voids, the easier the glass article may be separated from the first glass tube 415; since the number of repetitions of laser irradiation increases, a high-power oscillator is required due to limitation of processing speed.

Note that referring back to FIG. 11, in the first glass article 415, at least the first main surface 417 is chemically strengthened, and the second main surface 419 is chemically strengthened as required. Note that the four end faces 420 may or may not be chemically strengthened. In addition, in the first glass tube 415, the periphery of each glass piece 461, that is, the virtual end face is chemically strengthened.

Note that a chemically strengthened state, that is, a distribution state of introduced ions differs between the main surfaces 417, 419 and the virtual end faces.

That is, the introduced ions in the virtual end face are distributed along the extending direction of the internal void row as depicted in FIG. 13; that is, the introduced ions represent the concentration profile such as a half region with respect to a substantially parabolic shape or a shape substantially parabolic axis of symmetry.

Note that the concentration profile when a chemical strengthening treatment is applied to the first main surface and the second main surface as depicted in FIG. 10 does not change substantially even in a case where the measurement position in the virtual end face is changed, and the concentration profile tends to be almost the same at any position within the same virtual end face regardless of the position. Even in a case where a chemical strengthening treatment is applied only to the first main surface, introduced ions may also be present on the virtual end face, and the introduced ion concentration at the virtual end face becomes higher than the introduced ion concentration in the bulk.

With respect to the first glass tube 415, in the main surface 417 and the second main surface 419, the concentration of the introduced ions is substantially constant in a plane; the concentration profile of such an end surface indicates a distinct feature. In addition, a first glass article 415 having such a chemically strengthened virtual end face has not been recognized in the known technology.

Note that according to the inventors of the present invention, the virtual end face of the first glass tube 415 is chemically strengthened together with the first main surface 417 and the second main surface 419, when applying a typical chemical strengthening treatment to the first glass tube 415.

Accordingly, it may be considered that during the chemical strengthening treatment of the glass material of the first glass tube 415, a molten salt is introduced into the first glass tube 415 via intermittent voids contained in the virtual end face, and the virtual end face is further chemically strengthened by the substitution reaction occurring between the introduced molten salt and the virtual end face.

The first glass tube 415 having such a feature may be used as a supply member for providing a glass article. In particular, in the first glass tube 415, the virtual end face is chemically strengthened, and the glass article obtained from the first glass tube 415 thus has chemically strengthened end portions. Therefore, a glass article having sufficient strength may be provided by using the first glass tube 415. In addition, because an end face-to-be formed of a glass article does not appear before chemical strengthening the first glass tube 415 until separating a glass article from the first glass tube 415, the first glass tube 415 may be handled as a large plate as compared with a glass article. Hence, the surface and the virtual end face of the first glass tube 415 are unlikely to be scratched, and the deterioration of the strength is significantly controlled against.

Note that the first glass article 415 may include one or two or more additional members on at least one of the first main surface 417, the second main surface 419, and the end surface 420.

Such additional members may be provided in the form of, for example, layers, membranes, films, and the like. Further, since such an additional member may exhibit functions such as a low reflection function, high reflection function, wavelength selection function such as IR absorption function or UV absorption function, anti-glare function, anti-fingerprint function, anti-fog function, printing and their multilayer configuration function, the additional member may be provided on at least one of the first main surface 417, the second main surface 419, and the end surface 420.

EXAMPLES

Next, examples of the present invention will be described.

Samples of various glass articles were produced by the following method and characteristics of the produced glass articles were evaluated. In the present embodiment, the characteristics of the produced glass articles were evaluated with plate glass; however, the effect obtained by the idea of the present invention is apparent from the following results.
(Production Method of Sample A)

A glass substrate made of aluminosilicate glass having a length L of 100 mm in length and width, and a thickness t of 1.3 mm was prepared. The glass substrate corresponds to a glass material. For the glass substrate, a raw material plate before chemical strengthening of Dragontrail (registered trademark) was used. Hence, a glass composition of the glass substrate is the same as that of Dragontrail except for the alkali metal component substituted by the chemical strengthening treatment. The glass substrate was irradiated with laser from a direction of the main surface side to form two or more in-plane void regions in the vertical direction and the horizontal direction.

For the laser, a burst laser (number of bursts: 3) produced by Rofin (Germany), which is capable of emitting a short pulsed-laser of the order of picoseconds, was used. The power of the laser was 90% of the power rating (50 W). The frequency of one burst of the laser is 60 kHz, the pulse width is 15 picoseconds, and one burst width is 66 ns. In addition, the number of times of laser irradiation was set to only once in each in-plane void region (accordingly, 1-pass laser irradiation). In each in-plane void region, the distance P between the centers of the adjacent surface voids was set to 5 μm.

Figure 16:
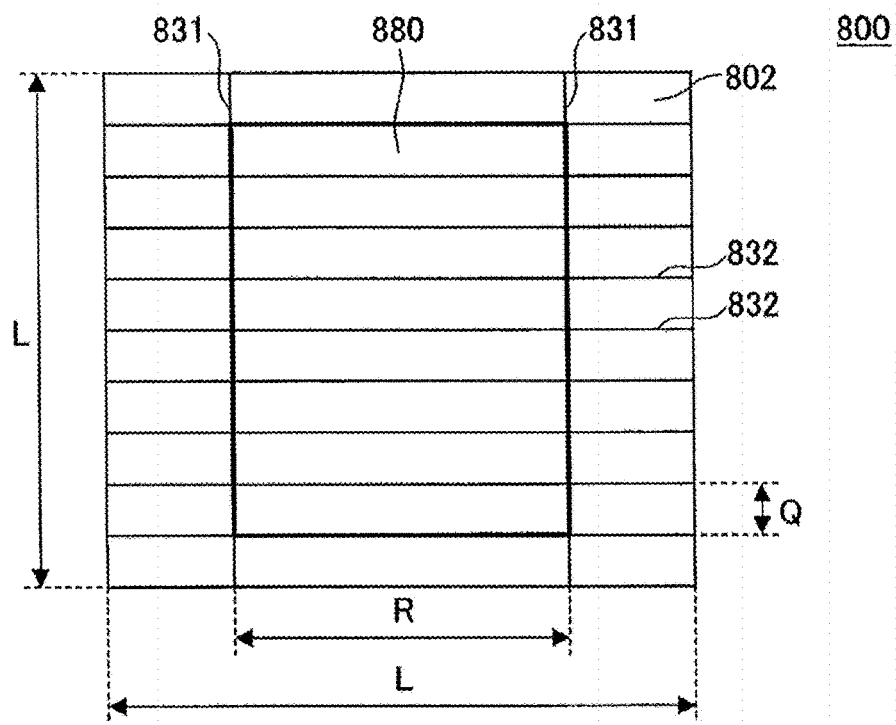
FIG. 16 is a diagram illustrating a relationship between a glass substrate and acquired samples in Examples.

As illustrated in FIG. 16, in a first main surface 802 of the glass substrate 800, two in-plane void regions 831 were formed in the vertical direction and nine in-plane void regions 832 were formed in the horizontal direction. An interval R between the in-plane void regions 831 in the vertical direction was 60 mm and an interval Q between the in-plane void regions 832 in the horizontal direction was 10 mm.

Note that the laser was irradiated in a direction orthogonal to the first main surface 802. Accordingly, internal void rows formed under the in-plane void regions 831 and 832 extend substantially parallel to a thickness direction of the glass substrate 800.

Next, a chemical strengthening treatment was applied to the obtained glass substrate 800.

The chemical strengthening treatment was conducted by immersing the entire glass substrate 800 in potassium nitrate molten salt. The treatment temperature was 435° C., and the treatment time was 1 hour.

Next, a total number of 8 samples 880 was obtained from the center portion (thick frame portion in FIG. 16) of one glass substrate 800 by pushing and separating the glass substrate 800 along the respective in-plane void regions 831 and 832. Each sample 880 had a length (see a length R in FIG. 16) of approximately 60 mm and a width (see length Q in FIG. 16) of approximately 10 mm. Each of the four end faces of each sample 880 corresponded to the aforementioned virtual end face. When the end faces of each sample were visually observed, defects such as scratches were not identified.

Each of the samples 880 produced in this method is referred to as a sample A.
(Production Method of Sample B)

A glass substrate similar to the glass substrate used in the sample A was cut after formation of in-plane void regions and internal void rows under the same laser conditions as in the sample A to thereby obtain two or more samples each having a length of 60 mm and a width of 10 mm. Thereafter, each sample was chemically strengthened to prepare a sample B. The conditions of the chemical strengthening treatment were the same as in those of the sample A described above.

Note that some samples produced by this sample B production method had scratches on the end faces, which indicates that the samples produced by this sample B production method included some samples that were not intact. Thus, samples B were prepared by visually screening only intact samples. The chemical strengthening treatment was applied to the cut samples; such scratches were thus assumed to have formed during the process before the chemical strengthening treatment was applied to the cut samples.
(Production Method of Sample C)

A sample C was produced using the same glass substrate as the glass substrate used in the sample A. In a case of a sample C, a chemical strengthening treatment was directly applied to the glass substrate without laser irradiation, to produce a sample C. The conditions of the chemical strengthening treatment were the same as in those of the sample A described above.

Thereafter, the chemically strengthened glass substrate was cut under the same laser conditions as those of the sample A to thereby obtain two or more samples C having a length of 60 mm and a width of 10 mm.

Note that some samples produced by this sample C production method had scratches on the end faces, which indicates that the samples produced by this sample C production method included some samples that were not intact. Thus, samples C were prepared by visually screening only intact samples. Such scratches were assumed to have formed due to the difficulty in cutting the chemically strengthened glass substrate.

(Evaluation)

The samples A to C produced as described above were evaluated as follows.

(Stress Distribution Evaluation)

The stress distribution of the end faces of the sample A to C was evaluated. This stress was mainly due to chemical strengthening treatment. For the evaluation, a birefringence imaging system (abrio: produced by CRi Inc., USA) was used. In each sample, an evaluation target surface was an end face having a length of 60 mm and a thickness of 1.3 mm (hereinafter referred to as a "first end face").

Figure 17:
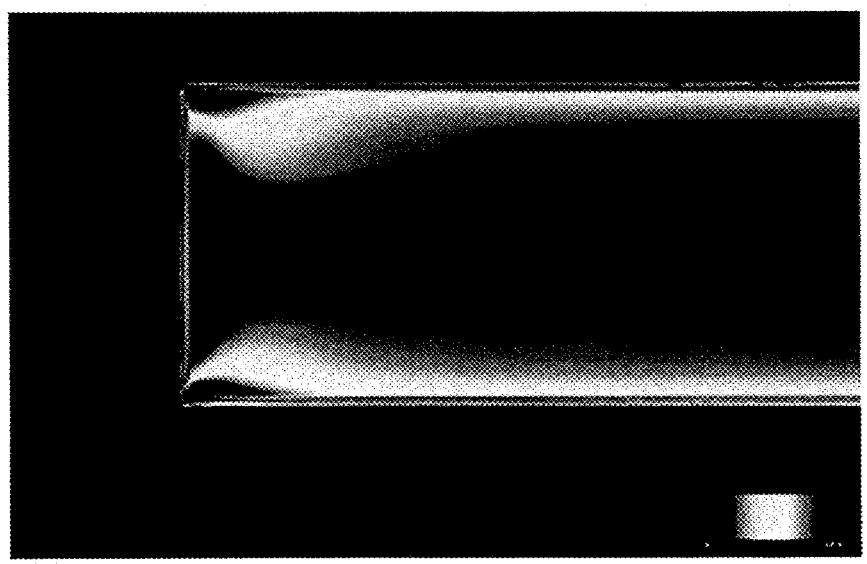
FIG. 17 is a diagram depicting an in-plane stress distribution result measured on a first end face of a sample A.
Figure 18:
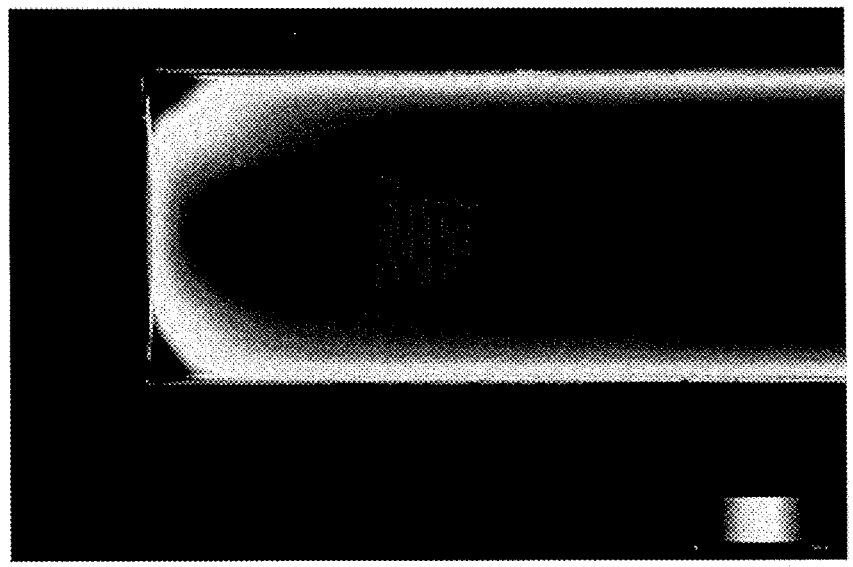
FIG. 18 is a diagram depicting an in-plane stress distribution result measured on a first end face of a sample B.
Figure 19:
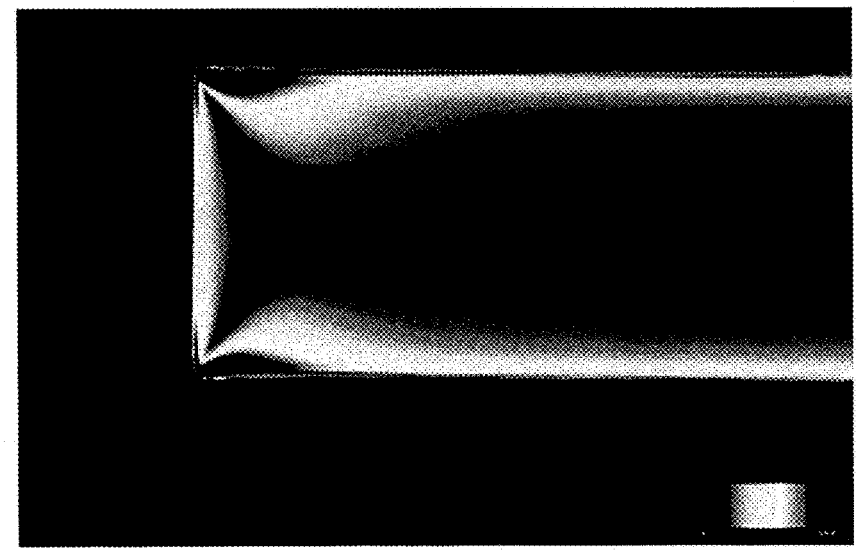
FIG. 19 is a diagram depicting an in-plane stress distribution result measured on a first end face of a sample C.

FIGS. 17 to 19 illustrate in-plane stress distribution results measured with the first end faces of samples A to C, respectively. Note that because FIGS. 17 to 19 are illustrated only in black-and-white, the stress distribution may not be fully clear. A relatively small tensile stress occurs in the central region on the right side of the figure and a tensile stress smaller than that in the central region on the right side of the figure occurs in the dense region from the left side end portion toward the right side of the figure, and the compression stress increases as the image portion gets darker (the region outside the white portion) in the vicinity of the upper left corner portion and the lower left corner portion and on the left end portion.

In addition, the used apparatus has not only information on the evaluation target surface but also information on the depth direction of the evaluation target surface. Hence, this evaluation may provide a result of integration of the stress values up to 10 mm in the depth direction from the evaluation target surface.

As depicted in FIG. 17, in the sample A, three outer surfaces, that is, upper and lower two main surfaces, and an end face having a width of 10 mm×a thickness of 1.3 mm (hereinafter referred to as "second end face") have large compressive stress. Specifically, the "second end face" has a large compressive stress throughout the entire thickness direction regardless of the position.

Further, as depicted in FIG. 18, in the sample B, a large compressive stress is present in all three outer surfaces.

In contrast, as depicted in FIG. 19, in the sample C, although a large compressive stress is present in the two upper and lower main surfaces, there is substantially no compressive stress in many portions of the second end face, particularly in the center in the thickness direction.

As described above, the results indicate that the second end face of the sample A had compressive stress almost equal to that of the end face of the sample B throughout the entire thickness direction.

(Analysis of Potassium Ions)

Next, the potassium ion concentration at the first end face was analyzed using each of samples A to C. Specifically, a line analysis using the EDX method (Energy Dispersive X-ray Spectrometry) was performed on the first end face of each sample.

Figure 20:
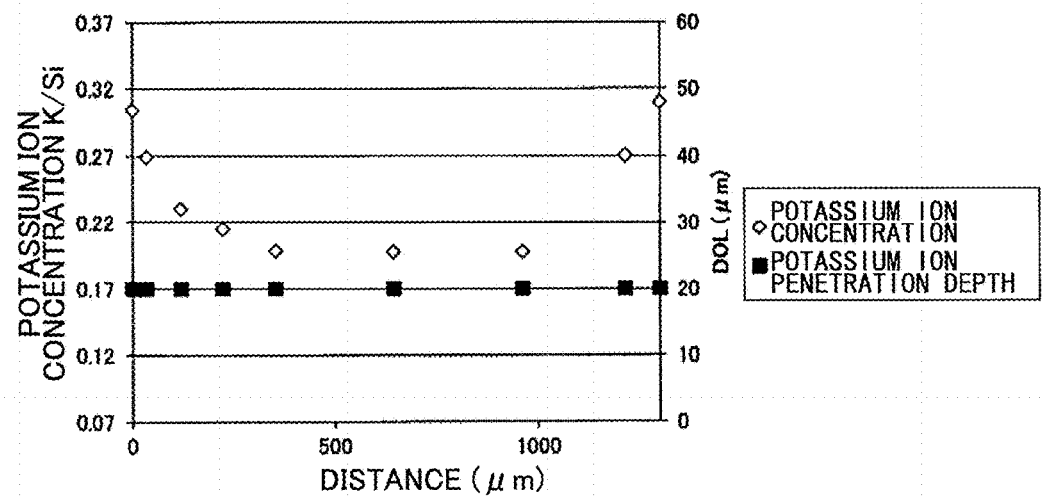
FIG. 20 is a graph illustrating results of a potassium ion concentration analysis obtained in sample A.
Figure 21:
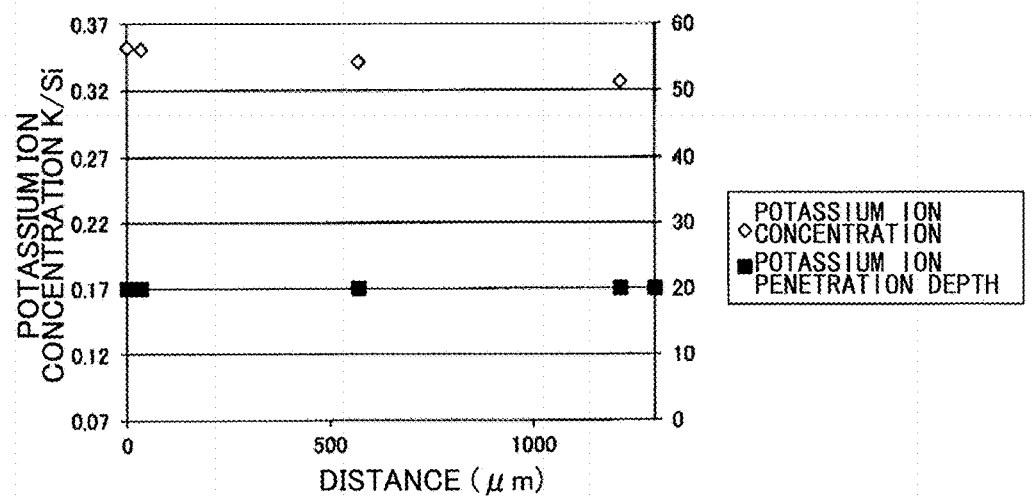
FIG. 21 is a graph illustrating results of a potassium ion concentration analysis obtained in sample B.
Figure 22:
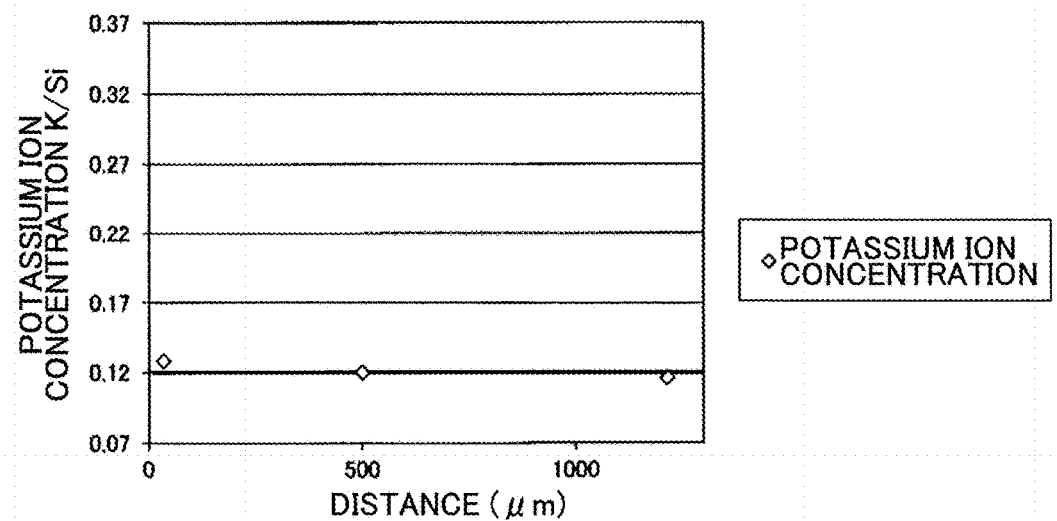
FIG. 22 is a graph illustrating results of a potassium ion concentration analysis obtained in sample C.

FIGS. 20 to 22 illustrate the results of the concentration analysis obtained for respective samples. In these figures, the horizontal axis is the distance from the first main surface at the first end surface, and this distance varies from 0 (the first main surface) to 1300 µm (the second main surface). The vertical axis (left axis) is the concentration (atomic ratio) of potassium ions normalized by silicon ions. In FIGS. 20 and 21, the profile of penetration depth of potassium ions is indicated on the right vertical axis for reference. This penetration depth represents a penetration depth of potassium ions in a direction orthogonal to the first end face measured by the EDX method. That is, this value represents the penetration depth of potassium ions in the depth direction from the first end face measured at each position along the direction of the distance defined as described above at the first end face.

These analyses were performed at several positions on the first end face of each sample, but the results obtained were nearly the same.

The results of FIG. 20 indicate that in the sample A, the concentration of potassium ions from the first main surface to the second main surface along the first end face indicates a substantially parabolic profile. That is, the potassium ion concentration tends to be high on the first main surface side and the second main surface side, and low in the middle portion between the two main surfaces.

Note that the potassium ion concentration (K/Si) originally contained in the glass substrate used for producing the sample A is 0.118 as a bulk concentration, that is, approximately 0.12. In contrast, in the profile of FIG. 20, the minimum value of potassium ion concentration (value at a depth of approximately 650 µm) is 0.19 to 0.20. Hence, in the sample A, potassium ions may be introduced throughout the first end face. Note that this is clear because the penetration depth of potassium ions does not greatly depend on the distance from the first main surface, and the potassium ions are introduced up to approximately 20 µm even at the position of the distance of 650 µm. The ratio of the minimum value of K/Si of the profile to the bulk concentration of K/Si is 1.6.

FIG. 21 illustrates the analyzed results of the sample B. In the sample B, the first end face is chemically strengthened similar to the first main surface and the second main surface. Hence, the potassium ion concentration does not depend on the distance on the horizontal axis, and indicates a substantially constant high value at any distance.

In contrast, as illustrated in FIG. 22, in the sample C, a sample is cut out after the chemical strengthening treatment is applied to the glass substrate. As a result, almost no potassium ions are introduced into the first end face. That is, regardless of the distance of the horizontal axis, the concentration of potassium ions in the glass substrate is equal to 0.12 as originally contained.

Thus, the results of the sample A indicate that potassium ions were introduced to the end face despite the fact that the sample was obtained after the chemical strengthening treatment.

(Strength Evaluation)

Next, the strength was evaluated by a 4-point bending test using each of samples A to C.

The 4-point bending test was conducted in the following two methods (flat bending test and longitudinal bending test).

(Flat Bending Test)

Figure 23:
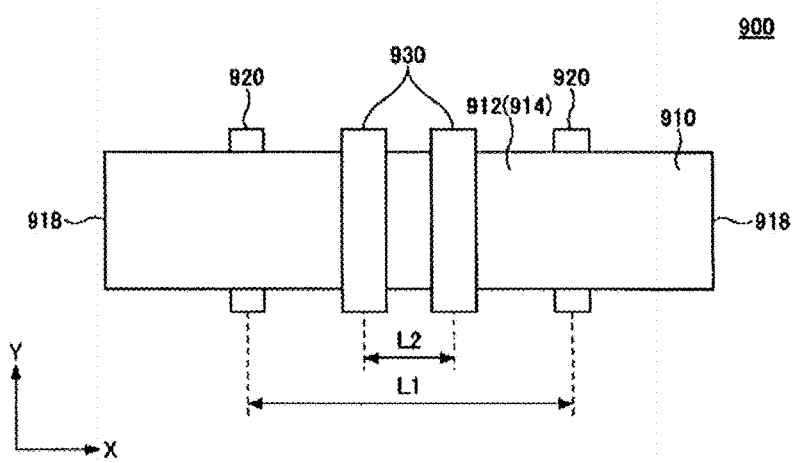
FIG. 23 is a diagram schematically illustrating a configuration of a flat bending test apparatus.

FIG. 23 schematically depicts a configuration of a flat bending test apparatus.

As depicted in FIG. 23, the flat bending test apparatus 900 includes a pair of fulcrum members 920 and a pair of load members 930. The distance L1 between the centers of the fulcrum members 920 is 30 mm, and the distance L2 between the centers of the load members 930 is 10 mm. The fulcrum members 920 and the load members 930 each have a sufficiently long full length (length in Y direction) as compared with the thickness (10 mm) of a sample to be tested.

In the test, a sample 910 is horizontally placed on the two fulcrum members 920. The sample 910 is arranged such that each of second end faces 918 of the sample 910 has an equal distance from the center of the fulcrum members 920. In addition, the sample 910 is arranged such that the first main surface 912 or the second main surface 914 faces downward.

Next, the two load members 930 are placed above the sample 910 such that the center between the load members 930 corresponds to the center of the sample 910.

Next, a load is applied to the sample 910 from the top of the sample 910 by pressing the load members 930 against the sample 910. The head speed is 5 mm/min. In the test, the temperature in the room is approximately 23° C. and the relative humidity is approximately 60%. According to such a test, the maximum tensile stress obtained from the load when the sample 910 is broken is defined as a flat bending rupture stress.

(Longitudinal Bending Test)

Figure 24:
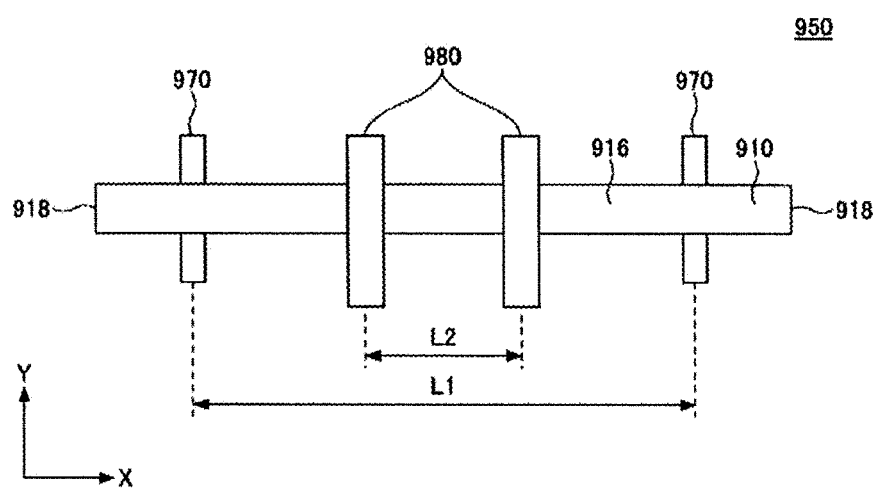
FIG. 24 is a diagram schematically illustrating a configuration of a longitudinal bending test apparatus.

FIG. 24 schematically depicts a configuration of a longitudinal bending test apparatus.

As depicted in FIG. 24, the longitudinal bending test apparatus 950 includes a pair of fulcrum members 970 and a pair of load members 980. The distance L1 between the centers of the fulcrum members 970 is 50 mm, and the distance L2 between the centers of the load members 980 is 20 mm. The fulcrum members 970 and the load members 980 each have a sufficiently long full length (length in Y direction) as compared with the thickness (1.3 mm) of a sample to be tested.

In the test, a sample 910 is horizontally placed on the two fulcrum members 970. The sample 910 is arranged such that each of second end faces 918 of the sample 910 has an equal distance from the center of the fulcrum members 970. Further, the sample 910 is arranged such that a first end face 916 faces upward. The sample 910 is supported so as not to fall over. To support the sample, the sample 910 is arranged such that friction will not be generated between the sample 910 and members for supporting the sample 910.

Next, the two load members 980 are placed above the sample 910 such that the center between the load members 980 corresponds to the center of the sample 910.

Next, a load is applied to the sample 910 from the top of the sample 910 by pressing the load members 980 against the sample 910. The head speed is 1 mm/min. In the test, the temperature in the room is approximately 23° C. and the relative humidity is approximately 60%. According to such a test, the maximum tensile stress obtained from the load when the sample 910 is broken is defined as a longitudinal bending rupture stress.

(Test Results)

Figure 25:
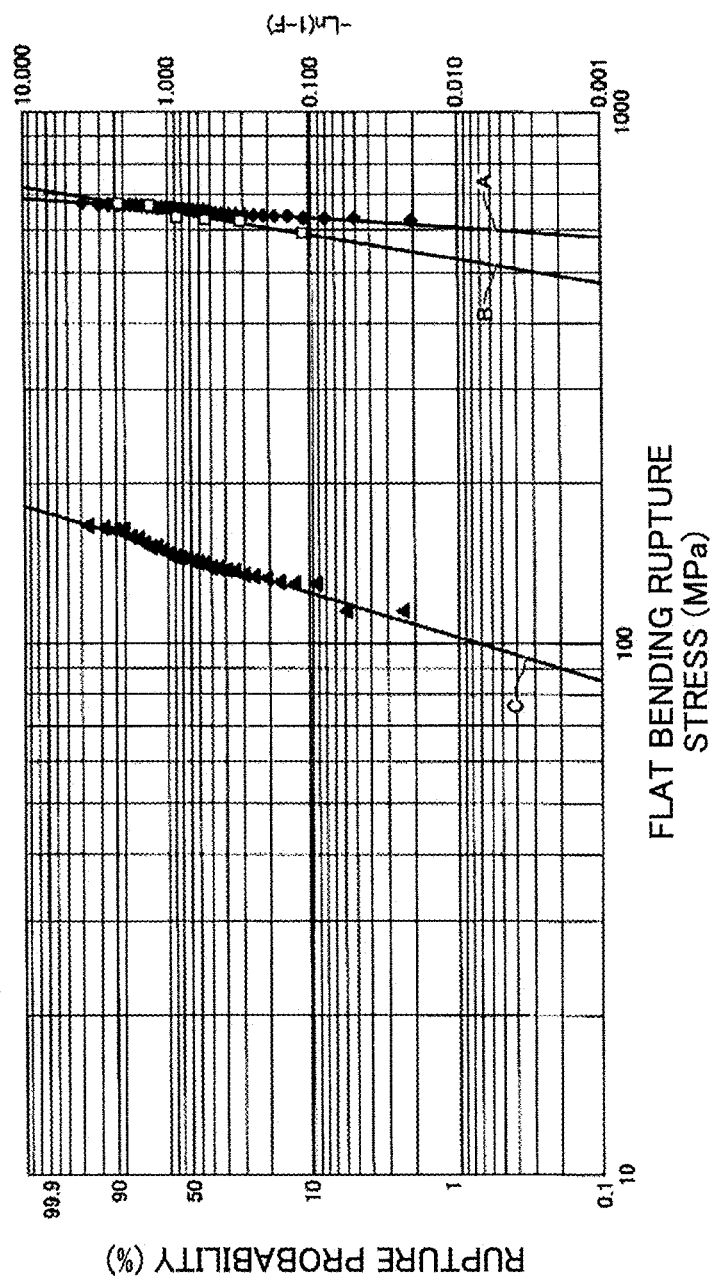
FIG. 25 is a diagram (Weibull distribution diagram) illustrating results of a flat bending test obtained for each sample.

FIG. 25 illustrates the summarized results of the flat bending test (Weibull distribution map) obtained in the samples A to C. The straight line fitting to the Weibull plot in each sample in the figure was obtained by the least squares method.

FIG. 25 illustrates that the sample C exhibited an insufficiently high rupture stress to indicate insufficient strength. In contrast, the sample A and sample B exhibited nearly the same sufficient strength.

In general, the slope of a straight line in a Weibull distribution map correlates with the variability between samples. In other words, the slope of the straight line becomes steeper as the variability between samples decreases.

In the result shown in FIG. 25, the slope of the straight line of the sample A is steeper than that of the sample B. Thus, in sample A, variability in strength between samples may be smaller than the variability in strength between samples in sample B. The reason for this is that in the sample A, since the internal void rows acting as the end portions are covered with the glass itself during the chemical strength-ening treatment, scratches are less likely to be formed and the variability in strength is reduced.

Figure 26:
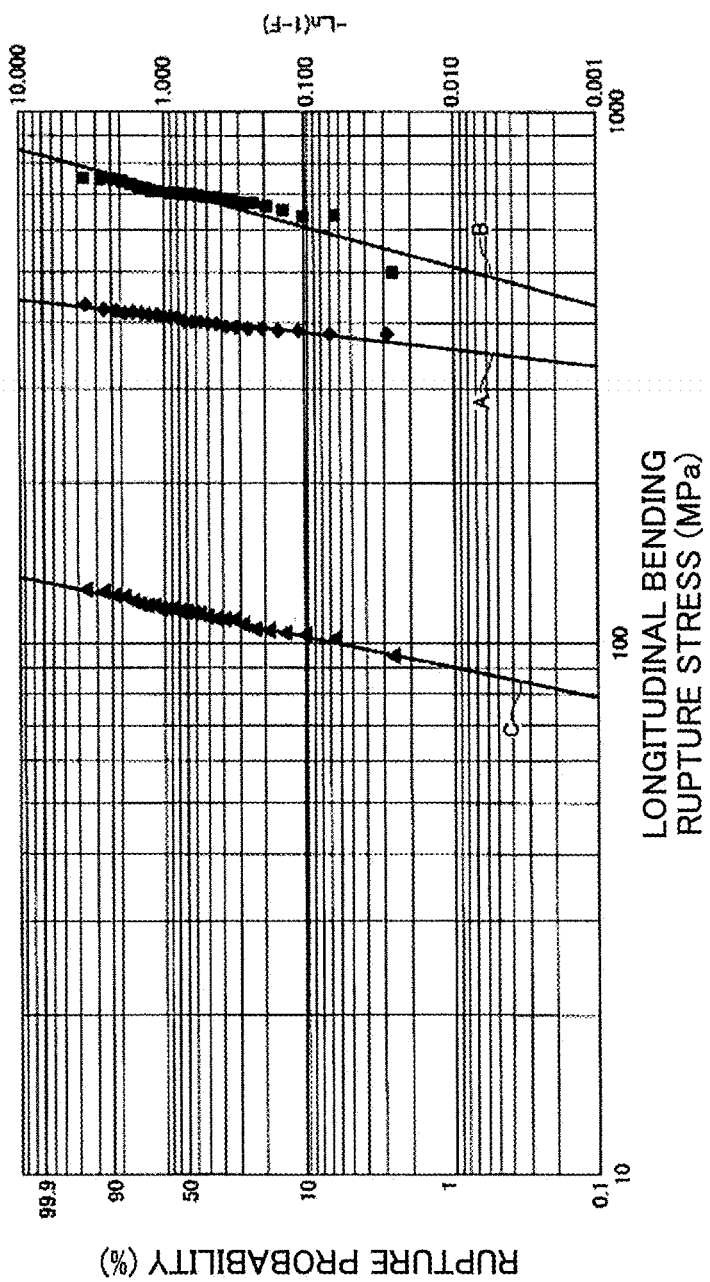
FIG. 26 is a diagram (Weibull distribution diagram) illustrating results of a longitudinal bending test obtained for each sample.

Next, FIG. 26 illustrates the summarized results of the longitudinal bending test (Weibull distribution map) obtained in the samples A to C. The straight line fitting to the Weibull plot in each sample in the figure was obtained by the least squares method.

FIG. 26 illustrates that the sample C exhibited an insufficiently high rupture stress to indicate insufficient strength. In contrast, the sample A and sample B exhibited sufficient strength. The rupture stress of sample A is slightly lower than the rupture stress of sample B because there is a difference in the potassium ion concentration between the two due to the chemical strengthening treatment at the first end face described above.

Further, as described above, the slope of the straight line of the sample A is steeper than that of the sample B; hence, the variability in strength between the samples in the sample A is smaller than that in the sample B. The reason for this is that in the sample A, since the internal void rows acting as the end portions are covered with the glass itself during the chemical strengthening treatment, scratches are less likely to be formed and the variability in strength is reduced.

As described above, in the sample A, potassium ions were introduced into the end face during the chemical strengthening treatment of the glass substrate, and as a result, the sample A exhibited sufficient strength.

From the above results, similar effects may be obtained in the present invention for glass tubes and glass articles.

Next, other examples of the present invention will be described.

Another Example 1

Three types of samples E, F and G were produced by the method as illustrated in the above-mentioned (PRODUCTION METHOD of Sample A).

Note that the sample E was produced from a glass substrate (glass material) having a thickness t of 0.5 mm, and the sample F was produced from a glass substrate (glass material) having a thickness t of 0.85 mm. In contrast, the sample G was produced from a glass substrate (glass material) having a thickness t of 1.3 mm. That is, the sample G was produced by the same method as sample A.

For each of samples E to G, the potassium ion concentration at the above-mentioned "first end face" was analyzed using the EPMA method (Electron Probe Micro Analyzer).

The analysis was conducted at the following three points on the first end face:

Any position corresponding to the first main surface of the glass material, that is, any position corresponding to one side of a length of 60 mm (referred to as "measurement region 1");

Any position moved from the position corresponding to the first main surface of the glass material by ¼ of the thickness along the thickness direction of the sample (the direction toward the second main surface of the glass material) ("measurement region 2"); and Any one position (referred to as "measurement region 3") moved from the position corresponding to the first main surface of the glass material by ½ of the thickness along the thickness direction of the sample.

Table 1 below represents the analyzed results of of potassium concentration obtained in each of the measurement regions of samples E to G.

TABLE 1

| SAMPLE | THICKNESS (mm) | Cs MEASUREMENT REGION 1 | MEASUREMENT REGION 2 | MEASUREMENT REGION 3 | PENETRATION DEPTH OF POTASSIUM IONS (μm) | Cs RATIO |
|---|---|---|---|---|---|---|
| E | 0.5 | 0.205 | 0.178 | 0.161 | 30 | 2.2 |
| F | 0.85 | 0.205 | 0.165 | 0.165 | 30 | 2.2 |
| G | 1.3 | 0.205 | 0.204 | 0.132 | 30 | 1.8 |

The potassium ion concentration is indicated by the concentration (atomic ratio) of potassium ions normalized by silicon ions, that is, Cs. To be accurate, the potassium ion concentration is maximized in the vicinity of the surface at a position slightly toward the depth direction orthogonal to the surface of each of the measurement regions (the width direction of the sample) of the corresponding measurement region. Hence, the Cs value at the position where the analysis value of K is the maximum in the vicinity of the surface in each measurement region is applied as Cs in the corresponding measurement region.

Note that the value of Cs obtained by the EPMA method may be different from the result of the aforementioned EDX method. Note that there is no effect in the evaluation of the profile.

Table 1 also indicates the penetration depth values of potassium ions in the respective measurement regions. This penetration depth represents the penetration depth along the depth direction (the width direction of the sample) such that there is no change in potassium ion concentration depth from the first end face.

Furthermore, Table 1 indicates the ratio of Cs in each measurement region to the bulk Cs (hereinafter referred to as "Cs ratio") calculated in the measurement region 3.

The results in Table 1 indicate that in samples E to G, potassium ions are introduced to the entire first end face and the concentration of potassium ions represents a profile of concentration increased from the central portion of the thickness toward the first main surface. Furthermore, the results indicate that the potassium ion concentration at the first end face was 1.8 times greater than the potassium ion concentration (bulk concentration) originally contained in the sample.

Another Example 2

Inner voids were formed in a glass tube made of soda-lime glass having an outer diameter of 40 mm, a tube thickness of 0.85 mm and a total length of 30 cm, using a burst laser (number of bursts=4) of Rofin Co. (Germany).

The irradiation conditions of the burst laser are as follows: the rotation speed of the glass tube is 89.5 rpm, the output of the laser is 90% of the rating (50 W), the frequency of one burst of laser is 37.5 kHz, the pulse width is 15 picoseconds, one burst width was 75 nanoseconds and the distance between the centers of adjacent inner voids was 5 μm. The number of times of laser irradiation was set to once in each in-plane void region.

Further, a chemical strengthening treatment was applied. The chemical strengthening treatment was conducted by immersing the entire glass tube in potassium nitrate molten salt. Treatment temperature was set to 400° C., 420° C., and 450° C., and treatment time was set to 6 hours, 8 hours, and 10 hours, respectively.

The glass tube did not separate along the internal void rows even after the chemical strengthening treatment was applied.

The glass tube after the application of a chemical strengthening treatment was separated by heating with a burner at one point of the internal void row. The end faces were separated without any problems after 1 to 2 seconds from the start of heating.

REFERENCE SIGNS LIST 110 glass material
112 first main surface
114 second main surface
116 end face
130, 131, 132 in-plane void region
138 surface void
138A, 138B surface void row
150 internal void row
158 void
160, 161, 162 glass piece
170 virtual end face
175 glass tube
380 first glass article
382 first main surface
384 second main surface
386 (386-1 to 386-2) end face
415 first glass tube
417 first main surface
419 second main surface
420 (420-1 to 420-2) end face
431 in-plane void region
461 glass piece
800 glass substrate
802 first main surface
831, 832 in-plane void region
880 sample
900 flat bending test apparatus
910 sample
912 first main surface
914 second main surface
918 second end face
920 fulcrum member
930 load member
950 longitudinal bending test apparatus
916 first end face
918 second end face
970 fulcrum member
980 load member

What is claimed is:
1. A glass tube production method comprising:
(1) preparing a tubular glass material;
(2) irradiating an outer main surface of the tubular glass material with a laser to form an in-plane void region having a plurality of voids arranged on the outer main surface, and forming a plurality of internal void rows each having one void or two or more voids arranged from the in-plane void region toward an inner main surface of the tubular glass material; and (3) chemically strengthening the tubular glass material having the internal void rows formed therein.

2. The glass tube production method according to claim 1, wherein in the in-plane void region, an interval between the adjacent voids falls within a range of 3 to 10 μm.

3. The glass tube production method according to claim 1, wherein in the (2) irradiating step, after the in-plane void region is formed by first-pass laser irradiation, at least one laser irradiation is additionally repeated along the in-plane void region to form the internal void rows from the outer main surface toward the inner main surface of the tubular glass material.

4. A glass article production method comprising:
producing a glass tube by the glass tube production method according to claim 1, the glass tube having a first main surface corresponding to the outer main surface of the glass material and a second main surface corresponding to the inner main surface of the glass material; and
separating one glass article, or two or more glass articles from the glass tube along a plane passing through the in-plane void region and the plurality of internal void rows.

5. The glass article production method according to claim 4,
wherein in the separating step, the one glass article or two or more glass articles are obtained by applying a pressure to the first main surface of the glass tube and/or by applying a tensile stress due to a thermal stress along the in-plane void region of the glass tube.

6. A glass tube comprising:
an in-plane void region having a plurality of voids arranged on an outer main surface of the glass tube;
a plurality of internal void rows having one void or two or more voids arranged from the in-plane void region toward an inner main surface of the glass tube; and
a cut surface obtained by cutting the glass tube to pass through the in-plane void region and the plurality of internal void rows, the cut surface having a compressive stress layer formed by applying a chemical strengthening treatment over the entire cut surface.

7. The glass tube according to claim 6,
wherein in the in-plane void region, an interval between the adjacent voids falls within a range of 3 to 10 μm.

8. The glass tube according to claim 6,
wherein the cut surface corresponds to an end face obtained by separating the glass article from the glass tube.

9. The glass tube according to claim 8,
wherein the cut surface has a chamfered or rounded connecting portion with the outer main surface and/or a chamfered or rounded connecting portion with the inner main surface.

10. A glass tube comprising:
an in-plane void region having a plurality of voids arranged on an outer main surface of the glass tube; and
a plurality of internal void rows each having one void or two or more voids arranged from the in-plane void region toward an inner main surface of the glass tube; and
a cut surface obtained by cutting the glass tube to pass through the in-plane void region and the plurality of internal void rows, the cut surface having a concentration profile of predetermined alkali metal ions from the outer main surface of the glass tube to the inner main surface of the glass tube indicating concentration of the predetermined alkali metal ions being higher than bulk concentration of the glass tube,
wherein the predetermined alkali metal ions provide a compressive stress layer to at least the outer main surface of the glass tube to increase strength of at least the outer main surface of the glass tube.

11. A glass tube comprising:
an in-plane void region having a plurality of voids arranged on an outer main surface of the glass tube; and
a plurality of internal void rows each having one void or two or more voids arranged from the in-plane void region toward an inner main surface of the glass tube; and
a cut surface obtained by cutting the glass tube to pass through the in-plane void region and the plurality of internal void rows, the cut surface having a concentration profile of predetermined alkali metal ions from the outer main surface of the glass tube to the inner main surface of the glass tube indicating concentration of the alkali metal ions becoming higher toward at least the outer main surface of the glass tube,
wherein the predetermined alkali metal ions provide a compression stress layer to at least the outer main surface of the glass tube to increase strength of at least the outer main surface of the glass tube, and
the concentration profile of the cut surface indicates concentration of the alkali metal ions being higher than bulk concentration of the glass tube.

12. A glass article comprising:
an outer main surface;
an inner main surface; and
at least one end face joining the outer and inner main surfaces,
wherein the end face has a concentration profile of predetermined alkali metal ions from the outer main surface to the inner main surface indicating concentration of the alkali metal ions becoming higher toward at least the outer main surface,
wherein the predetermined alkali metal ions provide a compression stress layer to at least the outer main surface to increase strength of at least the outer main surface, and
wherein the concentration profile of the end face indicates concentration of the alkali metal ions being higher than bulk concentration of the glass article.

13. The glass article according to claim 12,
wherein the predetermined alkali metal ions are sodium ions and/or potassium ions.

14. The glass article according to claim 12,
wherein the end face has a chamfered or rounded connecting portion with the outer main surface and/or a chamfered or rounded connecting portion with the inner main surface.

15. A glass article producing apparatus comprising:
a separation unit configured to separate one glass article or two or more glass articles from the glass tube according to claim 6,
wherein the separation unit separates the one glass article or two or more glass articles by applying a pressure to the outer main surface of the glass tube and/or by applying a tensile stress due to a thermal stress along the in-plane void region of the glass tube.

* * * * *